United States Patent
Sugimoto

(10) Patent No.: US 7,925,085 B2
(45) Date of Patent: Apr. 12, 2011

(54) IMAGE DATA PROCESSING DEVICE AND IMAGE DATA PROCESSING METHOD

(75) Inventor: Noriko Sugimoto, Konan (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1050 days.

(21) Appl. No.: 11/727,479

(22) Filed: Mar. 27, 2007

(65) Prior Publication Data

US 2007/0223043 A1 Sep. 27, 2007

(30) Foreign Application Priority Data

Mar. 27, 2006 (JP) .................................. 2006-085573

(51) Int. Cl.
*G06K 9/00* (2006.01)
*H04N 1/40* (2006.01)

(52) U.S. Cl. ...................................... 382/169; 358/3.01

(58) Field of Classification Search .................. 382/169, 382/237, 252, 274, 275, 298, 300, 302, 305, 382/312; 358/1.12, 1.8, 3.01, 3.03, 3.05, 358/3.21, 505, 521, 525, 528, 535
See application file for complete search history.

(56) References Cited

U.S. PATENT DOCUMENTS

| | | | | |
|---|---|---|---|---|
| 5,729,625 A * | 3/1998 | Miyake | ......................... | 382/169 |
| 6,292,268 B1 * | 9/2001 | Hirota et al. | ................... | 358/3.03 |
| 6,333,998 B1 * | 12/2001 | Matsumoto | .................... | 382/217 |
| 6,783,203 B2 * | 8/2004 | Fujimori | .......................... | 347/15 |
| 7,411,694 B2 * | 8/2008 | Nomizu | ........................ | 358/1.16 |
| 7,463,387 B2 * | 12/2008 | Hagai et al. | ................... | 358/3.03 |
| 7,483,169 B2 * | 1/2009 | Murakami | ...................... | 358/1.9 |

FOREIGN PATENT DOCUMENTS

| | | |
|---|---|---|
| JP | 09-65126 | 3/1997 |
| JP | 09-107465 | 4/1997 |
| JP | 2001-8033 | 1/2001 |

OTHER PUBLICATIONS

Japanese Office Action, with partial English translation, issued in Japanese Patent Application No. JP 2006-085573 dated on Apr. 1, 2008.

* cited by examiner

*Primary Examiner* — Kanji Patel
(74) *Attorney, Agent, or Firm* — McDermott Will & Emery LLP

(57) ABSTRACT

An image data processing device for converting original data containing gradation-value data, into processed data containing multilevel-value data. The processing device includes: (a) a processed-image gradation-value data generator for generating, based on the original data, gradation-value data relating to each pixel of the processed image, by causing a plurality of pixel lines constituting the processed image to be sequentially subjected to a line processing; (b) a processed-image multilevel-value data generator for generating, based on the generated gradation-value data and according to an error diffusion technique, the multilevel value data relating to each pixel of the processed image, by causing the plurality of pixel lines to be sequentially subjected to a line processing; and (c) a line-processing direction controller for causing the line processings to be executed on each pixel line in the same direction, and to invert each of processing directions of the respective line processings each time when the subjected pixel line is shifted from one to another. Also disclosed is an image data processing method.

14 Claims, 22 Drawing Sheets

ORIGINAL IMAGE LINE No. : $x_m$

PROCESSED IMAGE LINE No. : $x_M$ $x_M = f_M(x_m)$ $x_m = f_M^{-1}(x_M)$

FIG.15A

|  | $C_n-2$ | $C_n-1$ | $C_n$ | $C_n+1$ | $C_n+2$ |
|---|---|---|---|---|---|
| $C_M-2$ | 0 | 1 | 2 | 1 | 0 |
| $C_M-1$ | 1 | 2 | 6 | 2 | 1 |
| $C_M$ | 2 | 6 | 32 | 6 | 2 |
| $C_M+1$ | 1 | 2 | 6 | 2 | 1 |
| $C_M+2$ | 0 | 1 | 2 | 1 | 0 |

|  | $C_n-2$ | $C_n-1$ | $C_n$ | $C_n+1$ | $C_n+2$ |
|---|---|---|---|---|---|
| $C_M-2$ | 0 | -2 | -4 | -2 | 0 |
| $C_M-1$ | -2 | -4 | -12 | -4 | -2 |
| $C_M$ | -4 | -12 | 32 | -12 | -4 |
| $C_M+1$ | -2 | -4 | -12 | -4 | -2 |
| $C_M+2$ | 0 | -2 | -4 | -2 | 0 |

70

IMAGE DATA PROCESSING DEVICE AND IMAGE DATA PROCESSING METHOD

This application is based on Japanese Patent Application No. 2006-085573 filed on Mar. 27, 2006, the content of which is incorporated hereinto by reference.

BACKGROUND OF THE INVENTION

1. Field of the Invention

The present invention relates in general to an image data processing device and an image data processing method, and more particularly to such image data processing device and method for converting image data representative of an image composed of matrix-arranged pixels into another image data.

2. Discussion of Related Art

There is known a technique for converting image data of an image composed of matrix-arranged pixels, which is commonly practiced by causing a plurality of pixel lines constituting the image to be sequentially subjected to a sequential or line processing that is executed to generate data of each of pixels composing the subjected pixel line such that generation of the data is made sequentially along the subjected pixel line in a predetermined processing direction. The subjected pixel line is shifted from one to another so that the line processing is repeatedly executed. JP-2001-8033A discloses an image data conversion processing for converting gradation-value data of each pixel into multilevel-value data of each pixel according to an error diffusion technique, wherein the processing direction is inverted each time when the subjected pixel line is shifted from one to another during the image data conversion processing.

SUMMARY OF THE INVENTION

In the image data conversion processing, there is a need for high speed of the processing and also high accuracy of the processing, i.e., high quality of image that is formed of the converted image data. Therefore, unlimited efforts are directed to improvement of the processing speed and the image quality. Also in the image data conversion processing as disclosed in JP-2001-8033A, i.e., in an image data conversion processing in which the processing direction of the line processing is changed, the improvement of the processing speed and the image quality is a large issue to be achieved, and utility of the processing could be increased by achieving the improvement in the processing speed and the image quality.

The present invention was made in the light of the background art discussed above. It is therefore an object of the invention to provide image data processing device and method having high utility. This object may be achieved according to the principle of this invention, which provides image data processing device and method arranged to perform a multileveling processing and a pre-multilevel processing, wherein the multileveling processing is performed to convert gradation-value data of each pixel into multilevel-value data according to an error diffusion technique, and wherein the pre-multilevel processing is performed, prior to the multileveling processing, to generate the gradation-value data of each pixel of a processed image, based on image data representative of an original image. Each of the pre-multilevel processing and the multileveling processing is performed by causing a plurality of pixel lines constituting the image to be sequentially subjected to a sequential or line processing, which is executed to generate the gradation-value data or multilevel-value data of each pixel composing the subjected pixel line such that generation of the data proceeds sequentially along the subjected pixel line in a predetermined proceeding or processing direction. The line processing of the pre-multilevel processing and the line processing of the multileveling processing are executed on each of the pixel lines in the same processing direction, i.e., in one of opposite directions. That is, where the line processing of the pre-multilevel processing is executed on one of the pixel lines in a direction from one of opposite ends of the pixel line to the other of the opposite ends, the line processing of the multileveling processing is executed on the same one of the pixel lines in the same direction, i.e., in the direction from the one of the opposite ends of the pixel line to the other of the opposite ends. Further, in the line processing of the pre-multilevel processing and the line processing of the multileveling processing, the processing direction is inverted each time when the subjected pixel line is shifted from one to another.

In the image data processing device and method according to the invention, the multileveling processing is performed in accordance with the error diffusion technique such that the processing direction is inverted each time when the pixel line subjected to the line processing is shifted from one to another, namely, such that the multileveling processing is performed on each adjacent two of the pixel lines in respective opposite directions. The inversion of the processing direction upon shifting of the subjected pixel line makes it possible to effectively alleviate or restrain reduction in quality of the processed image which could be caused, for example, by a tendency that accumulated error increases in one of the opposite directions. Therefore, each of the image data processing device and method according to the invention provides image data that enables formation of the image having a high quality. Further, in the image data processing device and method according to the invention, the pre-multilevel processing is also performed with the processing direction being inverted upon shifting of the subjected pixel line such that the line processing of the pre-multilevel processing is executed on each pixel line in the same direction as the line processing of the multileveling processing. This arrangement eliminates necessity of storing the image data, which is obtained by the pre-multilevel processing, in a data storage device, and necessity of reading out the image data from the data storage device while performing the multileveling processing. Thus, the image data processing as a whole can be rapidly achieved.

VARIOUS MODES OF THE INVENTION

There will be described various modes of the invention deemed to contain claimable subjected matter for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be constructed in the light of the following descriptions of the various modes and a preferred embodiment of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiment of the invention, and that the invention may be embodied with such a possible combination with respect to the same mode.

(1) An image data processing device for converting original data as image data representative of an original image composed of a plurality of pixels that are arranged in a matrix, into processed data as image data representative of a processed image composed of a plurality of pixels that are arranged in a matrix, wherein the original data contains property-value data relating to properties of each of the pixels of the original image while the processed data contains property-value data relating to properties of each of the pixels of the processed image, the image data processing device including: (i) a processed-image data generator operable to generate, based on the original data, the property-value data of each of the pixels of the processed image, by causing a plurality of pixel lines constituting the processed image to be sequentially subjected to a line processing, which is executed to generate the property-value data of each of the pixels composing the subjected pixel line such that generation of the property-value data proceeds sequentially along the subjected pixel line in a predetermined processing direction; and (ii) a line-processing direction controller operable to invert the predetermined processing direction each time when the subjected pixel line is shifted from one to another in execution of the line processing, namely, to cause the line processing to be executed on each adjacent two of the pixel lines in respective opposite directions as the processing direction.

The "image data", which is to be subjected to the image data processing device, can be considered as a data set representative of property values of the pixels that are related with positions of the pixels in the matrix of the image. The "property-value data" of each pixel contains various data such as data relating to optical property values indicative of optical properties of each pixel and data relating to property values that are suitably set for an image formation processing performed by an image forming device such as printer. Specifically described, the optical property values include values indicative of density and brightness of each pixel where a monochrome image is to be formed, and include values indicative of RGB intensity and CMY or CMYK density and various parameters relating to various color systems (e.g., L*a*b*, L*C*h*, tristimulus values) where a color image is to be formed. The property values (that are set for the image formation processing by the image forming device) contain various values such as a value indicative of presence or absence of a dot that corresponds to each pixel so as to be formed on a recording medium and a value indicative of size of the dot. The property value data of each pixel of the processed image and the property value data of each pixel of the original image may be provided by various data that are suitably determined depending on processings performed by the present image data processing device. Further, the property value data of the respective pixels may be either the same to or different from each other in kind. Still further, the property value data may be provided by, for example, either gradation-value data (that is a concept encompassing also an analogue continuous value) or multilevel-value data represented by a selected one of two or more than three values. It is noted that, in the description of the present specification, the term "multilevel-value data" is interpreted to mean not only data represented by a value selected from three or more values but also binary data represented by a value selected from two values, i.e., "0" and "1".

Each of the "original image" and the "processed image" may be conceptually defined to be composed of a plurality of pixels that are arranged in a two-dimensional matrix. In other words, each of the original image and the processed image may be defined to be composed of a plurality of pixel lines each of which is composed by a plurality of pixels arranged along the pixel line. The "processed image" is an image that is defined for convenience of description, and may be interpreted to mean a conceptual image which is obtained through processings performed by the present image data processing device and which is defined by a particular pixel matrix. The number of the pixel lines and the number of the pixels composing each of the pixel lines (hereinafter referred to as "pixel-line number" and "pixel-column number", respectively, where appropriate) of the processed image may be either the same to or different from those of the original image. The original image and the processed image can be different from each other with respect to at least one of the pixel-line number and the pixel-column number, for example, where the image data processing device is capable of performing at least one of a compression and an enlargement for compressing and enlarging size of the original image in at least one a pixel-line direction (i.e., a direction in which each pixel line extends) and a pixel-column direction (i.e., a direction in which the pixel lines are arranged).

The "processed-image data generator" included in the image data processing device is a functional portion that plays as a main role in the image data processing device. The processed-image data generator as the main-role portion of the device may be constructed to be capable of performing various processings, which are not particularly limited, such as conversion processing is performed, for example, where the original image data is constituted by property value data relating to optical properties of each pixel, to convert the property value data to other kind of property value data; filtering processing that is performed to smooth or enhance the property value data of each pixel relative to property value data of the neighboring pixels; correction processing that is performed to subject the property value data of each pixel to γ correction or other correction; compression and enlargement processings that are performed to compress and enlarge original image, respectively; and multileveling processing that is performed to convert a gradation-value data to a multilevel-value data. The processed-image data generator may be arranged to be capable of performing a single one, some or all of the above-described processings. Where the plurality of processings are performed by the processed-image data generator, the processed-image data generator may provided by a plurality of functional portions each assigned to perform a corresponding one of the plurality of processings.

Each processing is performed by the processed-image data generator by causing the plurality of pixel lines to be subsequently subjected to the above-described line processing, namely, by repeating the line processing while shifting the subjected pixel line from one to another. In other words, the line processing is executed to cause pixels composing the subjected pixel line to be sequentially scanned in a direction in which the composing pixels are arranged, i.e., in a direction (hereinafter referred to as "main scanning direction" that is denominated in view of manner of the processing) in which the pixel line extends, and the line processing is repeated for causing the pixel lines to be sequentially scanned in a direction (hereinafter referred to as "sub-scanning direction that is denominated in view of the manner of the processing) in which the pixel lines are arranged. It is noted that the performance of each processing by the processed-image data generator is made according to the matrix defining the processed image.

The "line-processing direction controller" included in the image data processing device can be considered as a functional portion operable to control the processed-image data generator such that the line processing (executed along the main scanning direction) is placed alternately in forward and reverse modes. While the line processing is being placed in the forward mode, the line processing is executed with the pixels being sequentially scanned in a direction (hereinafter referred to as "forward direction") from the pixel that is located in one of opposite ends of the pixel line to the pixel that is located in the other of the opposite ends of the pixel line. While the line processing is being placed in the reverse mode, the line processing is executed with the pixels being sequentially scanned in another direction (hereinafter referred to as "reverse direction") from the pixel that is located in the above-described other of the opposite ends of the pixel line to the pixel that is located in the above-described one of the opposite ends of the pixel line. That is, the line-processing direction controller can be regarded as the functional portion operable to invert the processing direction of the line processing each time when the subject pixel line (i.e., the pixel line that is being currently subjected to the line processing) is shifted from one to another.

The image data processing device may be provided by an electronic circuit including various components, or alternatively, may be constituted principally by a computer that is arranged to execute predetermined routines for exhibiting functions required by the processing device.

(2) The image data processing device according to mode (1), wherein the processed-image data generator is capable of performing at least one of (a) a pixel-number reduction processing for thinning out original pixel-line component pixels as the pixels composing each of pixel lines constituting the original image whereby a number of processed pixel-line component pixels as the pixels composing each of the pixel lines of the processed image is made smaller than that of the original pixel-line component pixels, and (b) a pixel-number increase processing for interpolating the original pixel-line component pixels whereby the number of the processed pixel-line component pixels is made larger than that of the original pixel-line component pixels, the image data processing device further including (iii) a pixel-number change controller operable to control the line processing executed by the processed-image data generator, wherein the line processing is controlled by the pixel-number change controller, where the pixel-number reduction processing is performed, such that each of the pixel lines of the processed image is obtained by deleting some of the original pixel-line component pixels from a corresponding one of the pixel lines of the original image, and such that the pixel lines of the original image are the same to each other with respect to positions of the deleted pixels, and wherein the line processing is controlled by the pixel-number change controller, where the pixel-number increase processing is performed, such that each of the pixel lines of the processed image is obtained by adding pixels to a corresponding one of the pixel lines of the original image, and such that the pixel lines of the original image are the same to each other with respect to positions of the added pixels.

The image data processing device defined in this mode (2) is, described plainly, capable of performing at least one of a compression processing and an enlargement processing for respectively compressing and enlarging size of the original image in the main scanning direction, i.e., in the direction along which the line processing is executed. Where the compressing or enlargement processing is performed for compressing or enlarging the size of the original image in the main scanning direction, the pixel lines of the original image are not necessarily the same to each other with respect to positions of the deleted or added pixels, due to the inversion of the processing direction that is made each time when the subjected pixel line is shifted from one to another. That is, the positions of the deleted or added pixels in the matrix would be different among the pixel lines, even with an arrangement in which the pixels composing each pixel line are sequentially numbered by counting from one of the composing pixels that is located in a first column (i.e., a column which is located in an end of the pixel line and which is to be first subjected to the line processing) toward another one of the composing pixels that is located in a final column (i.e., a column which is located in another end of the pixel line and which is to be finally subjected to the line processing) so that the pixels having predetermined numerals are deleted or added. The difference of the positions of the deleted or added pixels among the pixel lines would result in deterioration of quality of the processed image. However, in the image data processing device defined in this mode (2), owing to the operation of the pixel-number change controller, such a difference of the positions of the deleted or added pixels in the matrix can be reliably eliminated, namely, all the pixel lines of the original image are the same to each other with respect to the positions of the deleted or added pixels.

(3) The image data processing device according to mode (2), wherein the pixel-number change controller controls the line processing (that is executed by the processed-image data generator), based on an index indicative of correspondence of the original pixel-line component pixels to the processed pixel-line component pixels.

This mode (3) recites an additional feature regarding a manner in which the line processing is controlled by the pixel-number change controller. The "index", which may be referred to as "pixel-correspondence indicative index" is not particularly limited, as long as it indicates relationships between columns of the original image (in which the respective original pixel-line component pixels are located) and columns of the processed image (in which the respective processed pixel-line component pixels are located), namely, as long as it indicates correspondence of the columns of the original image to the columns of the processed image. Specifically described, the index may be of any one of various kinds such as a data table and relational expression and function. The data table may be arranged to list numeral of the column (column No.) or numerals of the columns (columns Nos.) of the original image and the column (column No.) or numerals of the columns (columns Nos.) of the processed image corresponding to that or those of the original image. The expression or function may be arranged to indicate the above-described relationship. The line processing is controlled by referring to the data table where the index is provided by the data table, and is controlled by executing an operation according to the expression or function where the index is provided by the expression or function.

(4) The image data processing device according to any one of modes (1)-(3), wherein the processed-image data generator is capable of performing at least one of (A) a line-number reduction processing for thinning out pixel lines constituting the original image whereby a number of the pixel lines of the processed image is made smaller than that of the pixel lines of the original image, and (B) a line-number increase processing for interpolating the pixel lines of the original image whereby the number of the pixel lines of the processed image is made larger than that of the pixel lines of the original image.

(5) The image data processing device according to mode (4), wherein the at least one of the line-number reduction processing and the line-number increase processing is performed based on an index indicative of correspondence of the pixel lines of the original image to the pixel lines of the processed image.

The image data processing device defined in each of modes (4) and (5) is capable of performing at least one of the line-number reduction and increase processings (i.e., at least one of the compression and enlargement processings). In the processing device defined in mode (5), the at least one of the line-number reduction and increase processings is performed by using the index which may be referred to as "line-correspondence indicative index" and which is similar to the above-described pixel-correspondence indicative index. The availability of the compression or enlargement in the pixel-column direction in addition to in the pixel-line direction leads to further increase in the utility of the processing device.

(6) The image data processing device according to any one of modes (1)-(5), being for converting the original data that contains the property-value data in the form of gradation-value data relating to optical properties of each of the pixels of the original image, into the processed data that contains the property-value data in the form of multilevel-value data relating to properties of each of the pixels of the processed image, wherein the processed-image data generator includes (i-a) a processed-image gradation-value data generator operable to generate, based on the original data, gradation-value data relating to optical properties of each of the pixels of the processed image, by causing the plurality of pixel lines constituting the processed image to be sequentially subjected to a gradation-value-data-generation line processing, which is executed to generate the gradation value data of each of the pixels composing the subjected pixel line such that generation of the gradation-value data proceeds sequentially along the subjected pixel line in a gradation-value-data generation direction, and (i-b) a processed-image multilevel-value data generator operable to generate, based on the generated gradation-value data of each of the pixels of the processed image and according to an error diffusion technique, the multilevel value data relating to the properties of each of the pixels of the processed image, by causing the plurality of pixel lines constituting the processed image to be sequentially subjected to a multilevel-value-data-generation line processing, which is executed to generate the multilevel-value data of each of the pixels composing the subjected pixel line such that generation of the multilevel-value data proceeds sequentially along the subjected pixel line in a multilevel-value-data generation direction, wherein the line-processing direction controller causes the gradation-value-data-generation and multilevel-value-data-generation line processings to be executed on each of the pixel lines in the same direction as the gradation-value-data and multilevel-value-data generation directions, and to invert each of the gradation-value-data and multilevel-value-data generation directions each time when the subjected pixel line is shifted from one to another in execution of a corresponding one of the gradation-value-data-generation and multilevel-value-data generation line processings. Namely, the line-processing direction controller causes the gradation-value-data-generation and multilevel-value-data-generation line processings to be executed on each of the pixel lines in one of opposite directions as the gradation-value-data and multilevel-value-data generation directions, and to cause each of the gradation-value-data-generation and multilevel-value-data-generation line processings to be executed on each adjacent two of the pixel lines in respective opposite directions as a corresponding one of the gradation-value-data and multilevel-value-data generation directions, by inverting the corresponding one of the gradation-value-data and multilevel-value-data generation directions each time when the subjected pixel line is shifted from one to another.

The image data processing device defined in this mode (6) is, described plainly, arranged to perform the multileveling processing according to the error diffusion technique so as to convert the gradation-value data into the multilevel-value data and also to perform the pre-multilevel processing prior to the multileveling processing. If the line processings are executed on all the pixel lines in the same direction, i.e., in one of the opposite directions in the multileveling processing according to the error diffusion technique, errors produced in the conversion processings performed on the respective pixels are likely to be accumulate in an end portion of the matrix as viewed in the pixel-line direction, thereby causing possible reduction in quality of the processed image. Further, in the multileveling processing according to the error diffusion technique, there is possibility of occurrence of texture noise that is a problem inherent to the error diffusion technique. The inversion of the processing direction upon shifting of the subjected pixel line is effective to alleviate the problematic error accumulation and texture noise. In the image data processing defined in this mode (6), since the multileveling processing according to the error diffusion technique is performed by inverting the processing direction each time when the subjected pixel line is shifted from one to another, it is possible to obtain the image data that provides an image having a high quality. It is noted that the multilevel-value data, into which the gradation-value data is converted by the multileveling processing, should be interpreted to mean not only data represented by a value selected from three or more values but also binary data represented by a value selected from two values, i.e., "0" and "1". That is, the multileveling processing is a concept encompassing also a binarization processing.

The pre-multilevel processing performed prior to the multileveling processing is not limited to any particular one, but may include at least one of various processings such as property-value converting, filtering, compression and enlargement processings. Conventionally, it is common that the pre-multilevel processing is performed without changing the processing direction of the line processing. Therefore, where the multileveling processing is performed by changing the processing direction of the line processing, the image data obtained by the pre-multilevel processing is once stored in a data storage device as an external device and then the multileveling processing is performed by sequentially reading out the stored image data from the data storage device as the processing proceeds. Such a conventional arrangement in the image data conversion requires not only provision of the data storage device but also data transfer between the image data processing device and the external data storage device. The data transfer imposes a burden on the image data conversion and accordingly reduces the processing speed. In the image data processing device defined in this mode (6), the pre-multilevel processing is performed also by changing the processing direction of the line processing, and the processing direction of the line processing executed on each pixel line in the pre-multilevel processing and the processing direction of the line processing executed on the same pixel line in the multileveling processing coincide with each other, so that the multileveling processing can be performed successively on the property-value data of the respective pixels that are successively obtained as the pre-multilevel processing proceeds. Thus, the image data processing device defined in this mode (6) is capable of rapidly performing the image processing without relying on the data storage device as the external device.

(7) The image data processing device according to mode (6), wherein the processed-image data generator is capable of performing at least one of (a) a pixel-number reduction processing for thinning out original pixel-line component pixels as the pixels composing each of pixel lines constituting the original image whereby a number of processed pixel-line component pixels as the pixels composing each of the pixel lines of the processed image is made smaller than that of the original pixel-line component pixels, and (b) a pixel-number increase processing for interpolating the original pixel-line component pixels whereby the number of the processed pixel-line component pixels is made larger than that of the original pixel-line component pixels, the image data processing device further including a pixel-number change controller operable to control the gradation-value-data-generation line processing, wherein the gradation-value-data-generation line processing is controlled by the pixel-number change controller, where the pixel-number reduction processing is performed, such that each of the pixel lines of the processed image is obtained by deleting some of the original pixel-line component pixels from a corresponding one of the pixel lines of the original image, and such that the pixel lines of the original image are the same to each other with respect to positions of the deleted pixels, and wherein the gradation-value-data-generation line processing is controlled by the pixel-number change controller, where the pixel-number increase processing is performed, such that each of the pixel lines of the processed image is obtained by adding pixels to a corresponding one of the pixel lines of the original image, and such that the pixel lines of the original image are the same to each other with respect to positions of the added pixels.

(8) The image data processing device according to mode (6) or (7), wherein the processed-image gradation-value data generator of the processed-image data generator is capable of performing at least one of (A) a line-number reduction processing for thinning out pixel lines constituting the original image whereby a number of the pixel lines of the processed image is made smaller than that of the pixel lines of the original image, and (B) a line-number increase processing for interpolating the pixel lines of the original image whereby the number of the pixel lines of the processed image is made larger than that of the pixel lines of the original image.

The image data processing device defined in each of modes (7) and (8) is capable of performing at least one of the line-number reduction and increase processings (i.e., at least one of the compression and enlargement processings) in the pre-multilevel processing, so as to enjoy the above-described technical advantages that are provided by the at least one of the line-number reduction and increase processings.

(11) An image data processing method of converting original data as image data representative of an original image composed of a plurality of pixels that are arranged in a matrix, into processed data as image data representative of a processed image composed of a plurality of pixels that are arranged in a matrix, wherein the original data contains property-value data relating to properties of each of the pixels of the original image while the processed data contains property-value data relating to properties of each of the pixels of the processed image, the image data processing method including: (i) a processed-image data generating step of generating, based on the original data, the property-value data of each of the pixels of the processed image, by causing a plurality of pixel lines constituting the processed image to be sequentially subjected to a line processing, which is executed to generate the property-value data of each of the pixels composing the subjected pixel line such that generation of the property-value data proceeds sequentially along the subjected pixel line in a predetermined processing direction; and (ii) a line-processing direction controlling step of inverting the predetermined processing direction each time when the subjected pixel line is shifted from one to another in execution of the line processing, namely, causing the line processing to be executed on each adjacent two of the pixel lines in respective opposite directions as the processing direction.

(12) The image data processing method according to mode (11), wherein the processed-image data generating step includes at least one of (a) a pixel-number reduction processing for thinning out original pixel-line component pixels as the pixels composing each of pixel lines constituting the original image whereby a number of processed pixel-line component pixels as the pixels composing each of the pixel lines of the processed image is made smaller than that of the original pixel-line component pixels, and (b) a pixel-number increase processing for interpolating the original pixel-line component pixels whereby the number of the processed pixel-line component pixels is made larger than that of the original pixel-line component pixels, the image data processing method further including (iii) a pixel-number change controlling step of controlling the line processing executed in the processed-image data generating step, wherein the line processing is controlled, where the pixel-number reduction processing is performed, such that each of the pixel lines of the processed image is obtained by deleting some of the original pixel-line component pixels from a corresponding one of the pixel lines of the original image, and such that the pixel lines of the original image are the same to each other with respect to positions of the deleted pixels, and wherein the line processing is controlled, where the pixel-number increase processing is performed, such that each of the pixel lines of the processed image is obtained by adding pixels to a corresponding one of the pixel lines of the original image, and such that the pixel lines of the original image are the same to each other with respect to positions of the added pixels.

(13) The image data processing method according to mode (12), wherein the pixel-number change controlling step is implemented to control the line processing, based on an index indicative of correspondence of the original pixel-line component pixels to the processed pixel-line component pixels.

(14) The image data processing method according to any one of modes (11)-(13), wherein the processed-image data generating step includes at least one of (A) a line-number reduction processing for thinning out pixel lines constituting the original image whereby a number of the pixel lines of the processed image is made smaller than that of the pixel lines of the original image, and (B) a line-number increase processing for interpolating the pixel lines of the original image whereby the number of the pixel lines of the processed image is made larger than that of the pixel lines of the original image.

(15) The image data processing method according to mode (14), wherein the at least one of the line-number reduction processing and the line-number increase processing is performed based on an index indicative of correspondence of the pixel lines of the original image to the pixel lines of the processed image.

(16) The image data processing method according to any one of modes (11)-(15), being for converting the original data that contains the property-value data in the form of gradation-value data relating to optical properties of each of the pixels of the original image, into the processed data that contains the property-value data in the form of multilevel-value data relating to properties of each of the pixels of the processed image, wherein the processed-image data generating step includes (i-a) a processed-image gradation-value data generating step of generating, based on the original data, gradation-value data relating to optical properties of each of the pixels of the processed image, by causing the plurality of pixel lines constituting the processed image to be sequentially subjected to a gradation-value-data-generation line processing, which is executed to generate the gradation value data of each of the pixels composing the subjected pixel line such that generation of the gradation-value data proceeds sequentially along the subjected pixel line in a gradation-value-data generation direction, and (i-b) a processed-image multilevel-value data generating step of generating, based on the generated gradation-value data of each of the pixels of the processed image and according to an error diffusion technique, the multilevel value data relating to the properties of each of the pixels of the processed image, by causing the plurality of pixel lines constituting the processed image to be sequentially subjected to a multilevel-value-data-generation line processing, which is executed to generate the multilevel-value data of each of the pixels composing the subjected pixel line such that generation of the multilevel-value data proceeds sequentially along the subjected pixel line in a multilevel-value-data generation direction, wherein the line-processing direction controlling step is implemented to cause the gradation-value-data-generation and multilevel-value-data-generation line processings to be executed on each of the pixel lines in the same direction as the gradation-value-data and multilevel-value-data generation directions, and to invert each of the gradation-value-data and multilevel-value-data generation directions each time when the subjected pixel line is shifted from one to another in execution of a corresponding one of the gradation-value-data-generation and multilevel-value-data generation line processings. Namely, the line-processing direction controlling step is implemented to cause the gradation-value-data-generation and multilevel-value-data-generation line processings to be executed on each of the pixel lines in one of opposite directions as the gradation-value-data and multi-level-value-data generation directions, and to cause each of the gradation-value-data-generation and multilevel-value-data-generation line processings to be executed on each adjacent two of the pixel lines in respective opposite directions as a corresponding one of the gradation-value-data and multi-level-value-data generation directions, by inverting the corresponding one of the gradation-value-data and multilevel-value-data generation directions each time when the subjected pixel line is shifted from one to another.

(17) The image data processing method according to mode (16), wherein the processed-image data generating step is implemented to perform at least one of (a) a pixel-number reduction processing for thinning out original pixel-line component pixels as the pixels composing each of pixel lines constituting the original image whereby a number of processed pixel-line component pixels as the pixels composing each of the pixel lines of the processed image is made smaller than that of the original pixel-line component pixels, and (b) a pixel-number increase processing for interpolating the original pixel-line component pixels whereby the number of the processed pixel-line component pixels is made larger than that of the original pixel-line component pixels, the image data processing method further including a pixel-number change controlling step of controlling the gradation-value-data-generation line processing, wherein the gradation-value-data-generation line processing is controlled, where the pixel-number reduction processing is performed, such that each of the pixel lines of the processed image is obtained by deleting some of the original pixel-line component pixels from a corresponding one of the pixel lines of the original image, and such that the pixel lines of the original image are the same to each other with respect to positions of the deleted pixels, and wherein the gradation-value-data-generation line processing is controlled, where the pixel-number increase processing is performed, such that each of the pixel lines of the processed image is obtained by adding pixels to a corresponding one of the pixel lines of the original image, and such that the pixel lines of the original image are the same to each other with respect to positions of the added pixels.

(18) The image data processing method according to mode (16) or (17), wherein the processed-image gradation-value data generating step of the processed-image data generating step is implemented to perform at least one of (A) a line-number reduction processing for thinning out pixel lines constituting the original image whereby a number of the pixel lines of the processed image is made smaller than that of the pixel lines of the original image, and (B) a line-number increase processing for interpolating the pixel lines of the original image whereby the number of the pixel lines of the processed image is made larger than that of the pixel lines of the original image.

The image data processing method defined in each of modes (11)-(18) has the same technical features as the image data processing device defined in a corresponding one of modes (1)-(8), so that description thereof is omitted herein for avoiding unnecessary repetition of the same description.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which:

FIGS. 15A and 15B are views conceptually showing smoothing and enhancing filters, respectively, that are used in the filter-related processing;

DETAILED DESCRIPTION OF THE PREFERRED EMBODIMENTS

There will be described one embodiment of the present invention in the form of an image data processing device 10, by reference to the accompanying drawings. It is to be understood that the present invention is not limited to the following embodiment, and may be otherwise embodied with various changes and modifications, such as those described in the foregoing "VARIOUS MODES OF THE INVENTION", which may occur to those skilled in the art.

[Outline of Processings by Image Data Processing Device]

Figure 1:
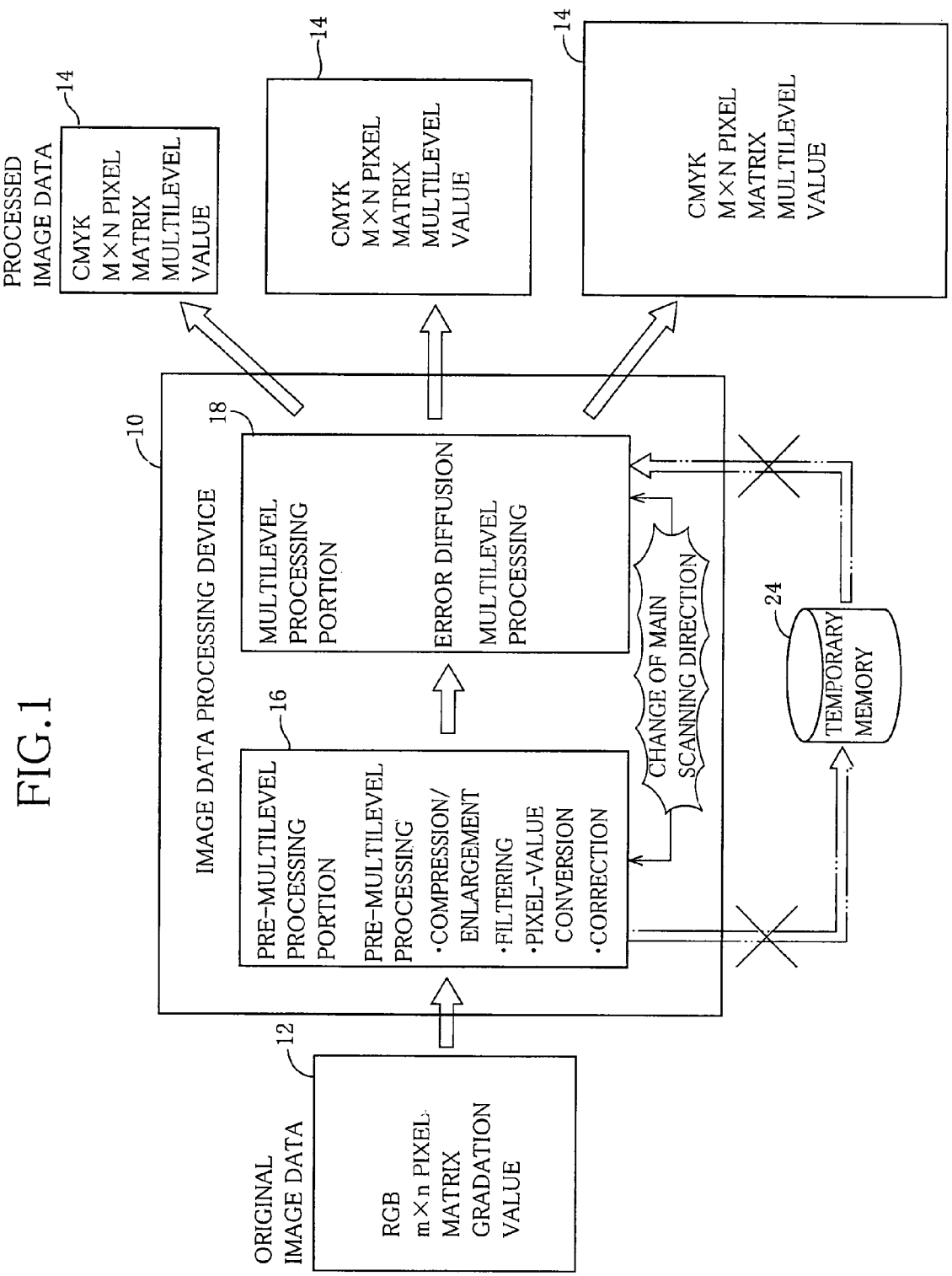
FIG. 1 is a view conceptually showing various processings performed by an image data processing device constructed according to the invention.

As shown in FIG. 1, the image data processing device 10 is arranged to convert an original image data (hereinafter referred simply to as "original data") as an image data representative of an original image 12 into a processed image data (hereinafter referred simply to as "processed data") as an image data representative of a processed image 14. That is, the image data processing device 10 is capable of practicing the image data processing method defined in the foregoing "VARIOUS MODES OF THE INVENTION".

The original image 12, which is to be subjected to an image-data conversion processing performed by the image data processing device 10, is an image defined by a pixel matrix having a predetermined number m of pixel lines and a predetermined number n of pixel columns. The original data contains a gradation-value data set indicative of RGB intensity of each of pixels arranged in the pixel matrix (i.e., data indicative of intensities of respective red, green and blue in each pixel) as a property-value data set of each pixel. On the other hand, the processed image 14, which is to be obtained after the image-data conversion, is an image defined by a pixel matrix having a predetermined number M of pixel lines and a predetermined number N of pixel columns. Since the image data processing device 10 has a function of selectively compressing and enlarging the image data, namely, since the device 10 is capable of performing image compression and enlargement processings, as described below, the number M of pixel lines and the number N of pixel columns of the processed image 14 can be made different from the number m of pixel lines and the number n of pixel columns of the original image 12. The processed data contains a CMYK multilevel-value data set of each of pixels arranged in the pixel matrix (i.e., a multilevel-value data set relating to cyan, magenta, yellow and black) as the property-value data set of each pixel.

The processings performed by the image data processing device 10 can be classified into two kinds of processings, one of which is a multileveling processing performed according to an error diffusion technique, and the other of which is a pre-multilevel processing performed prior to the multileveling processing. The pre-multilevel processing includes various processings such as compression/enlargement, filtering, pixel-value conversion and correction processings that are carried out as described below in detail. The pre-multilevel processing is performed by a pre-multilevel processing portion 16 serving as a processed-image gradation-value data generator, to convert the RGB-intensity gradation-value data set of each pixel of the original image 12 into a CMYK gradation-value data set of each pixel of the processed image 14. The CMYK gradation-value data set of each pixel of the processed image 14, which is generated in the pre-multilevel processing, is converted into the CMYK multilevel-value data set of each pixel of the processed image 14 in the subsequent multileveling processing that is performed by a multileveling processing portion 18 serving as a processed-image multilevel-value data generator. In the present embodiment, the pre-multilevel processing portion 16 and the multileveling processing portion 18 cooperate with each other to constitute a processed-image data generator of the image data processing device 10.

Each of the pre-multilevel processing and the multileveling processing is performed by subjecting each of a plurality of pixel lines 20 constituting the pixel matrix of the processed image 14 to a sequential or line processing. The line processing is repeatedly executed while the target or subjected pixel line is shifted from one to another in a direction in which the pixel lines 20 are arranged. In each of the repeated executions of the line processing, pixels 22 composing the subjected pixel line 20 are sequentially subjected to a pixel-unit processing. Namely, in each of the executions of the line processing, the pixel-unit processing is repeatedly executed while the target or subjected pixel 22 is shifted from one to another in a direction of the subjected pixel line 20, i.e., in a direction in which the pixels 22 (composing the subjected pixel line 20) are arranged. That is, each of the pre-multilevel processing and the multileveling processing is performed by executing the line processing to cause the pixels 22 composing the subjected pixel line 20 to be sequentially scanned in the pixel-line direction (i.e., main scanning direction) and repeating the line processing to cause the pixel lines 20 to be sequentially scanned in the pixel-column direction (i.e., sub-scanning direction).

Figure 2:
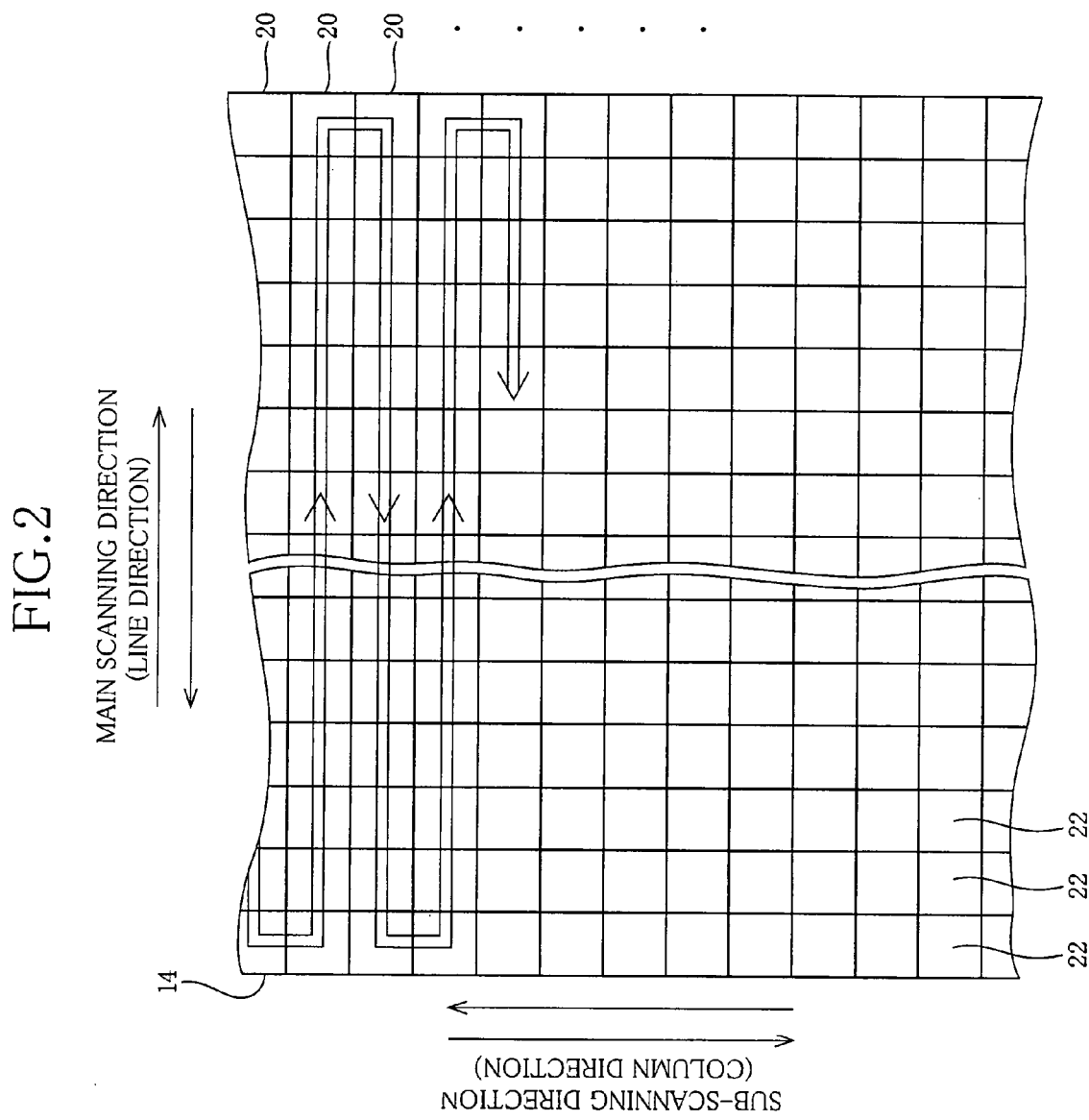
FIG. 2 is a view conceptually showing change of a main scanning direction during performance of an image data conversion processing by the image data processing device.

In the image-data conversion performed by the image data processing device 10, as shown in FIG. 2, the pixel line 20 currently subjected to the line processing is shifted in the sub-scanning direction that is a constant direction (i.e., a downward direction as seen in FIG. 2). Meanwhile, the line processing is executed in the main scanning direction that is inverted each time when the subjected pixel line 20 is shifted from one to another, so that the line processing is executed on each adjacent two of the pixel lines 20 in respective opposite directions, as shown in FIG. 2. The inversion of the processing direction of the line processing is made not only in the multileveling processing but also in the pre-multilevel processing, and the processing direction of the multileveling processing performed on each pixel line 20 and the processing direction of the pre-multilevel processing performed on the same pixel line 20 are the same to each other. Therefore, in the image-data conversion performed by the image data processing device 10, the property-value data set of each pixel 22 generated by the pre-multilevel processing portion 16 is supplied as a data unit to the multileveling processing portion 18, which in turn performs the multileveling processing onto the supplied property-value data set of each pixel 22. This arrangement can eliminate necessity of provision of a temporary memory 24 (data storage device), which would be arranged to store therein the property-value data sets of all the pixels of the processed image 14 that are generated by the pre-multilevel processing portion 16. Since there is no need for data communication with such a data storage device for transferring the image data, it is possible to rapidly perform the image-data conversion.

[Outline of Compression and Enlargement Processings]

As described above, in the pre-multilevel processing performed in the image data processing device 10, the compression and enlargement processings for compressing and enlarging the image can be performed. As to the processing in the pixel-column direction, i.e., in the sub-scanning direction, the compression and enlargement processings can be performed by thinning out and interpolating the pixel lines 20 of the original image 12. Namely, the compressing processing can be performed by deleting some of the pixel lines 20 while the enlargement processing can be performed by adding some pixel lines to the pixel lines 20. In this sense, the compression and enlargement processings for compressing and enlarging the image in the sub-scanning direction can be referred to as a line-number reduction processing and a line-number increase processing, respectively. As to the processing in the pixel-line direction, in the main scanning direction, the compression and enlargement processings can be performed by thinning out and interpolating the pixel columns of the original image 12. Namely, the compressing processing can be performed by deleting some of the pixel columns while the enlargement processing can be performed by adding some pixel columns to the pixel columns. In this sense, the compression and enlargement processings for compressing and enlarging the image in the main scanning direction can be referred to as a pixel-number reduction processing and a pixel-number increase processing, respectively.

Figure 3:
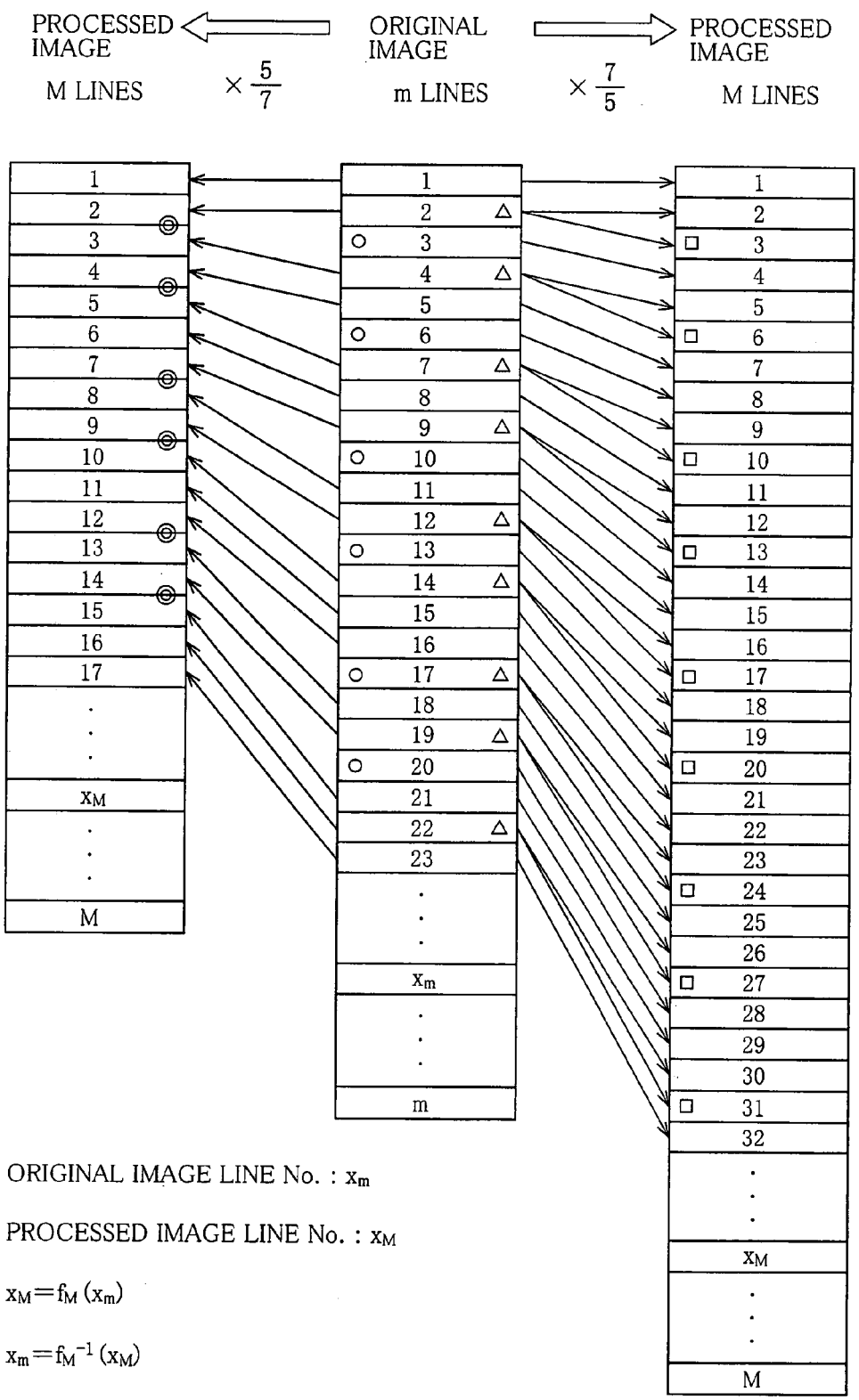
FIG. 3 is a view conceptually showing compression and enlargement of an image in a sub-scanning direction.

FIG. 3 shows, as examples of the compression and enlargement of the image in the sub-scanning direction, cases where the original image having the number m of pixel lines is compressed and enlarged into the processed image having the number M of pixel lines with a compression ratio of 5/7 and an enlargement ratio of 7/5, respectively. In the compression processing, the pixel lines of the original image are thinned out according to a predetermined rule. In the enlargement processing, the pixel lines of the original image are interpolated according to a predetermined rule. Specifically described, in the case of the compressing processing with the compression ratio of 5/7, the pixel lines Nos. 3, 6, 10, 13, 17, 20 . . . (that are marked with "○") of the original image are deleted so that the processed image has a matrix in which the pixel lines that used to exist between respective adjacent pairs of pixel lines (that are marked with "⊙") no longer exist. In the case of the enlarging processing with the enlargement ratio of 7/5, the pixel lines Nos. 2, 4, 7, 9, 12, 14, 17, 19, 22, . . . (that are marked with "Δ") of the original image are disposed as duplicated pixel lines Nos. 3, 6, 10, 13, 17, 20, 24, 27, 31, . . . (that are marked with "□") in the processed image.

The above-described rules, according to which the compressing and enlargement processings are performed, are defined by a line-correspondence indicative index in the form of line-correspondence functions $f_M$, $f_M^{-1}$ that vary depending on the compression and enlargement ratios. The line-correspondence functions $f_M$, $f_M^{-1}$ are expressed as follows:

$$x_M = f_M(x_m)$$

$x_m = f_M^{-1}(x_M)$, where "$x_m$" represents the numeral of the pixel line (pixel line No.) of the original image while "$x_M$" represents the numeral of the pixel line (pixel line No.) of the processed image. That is, each of the functions $f_M$, $f_M^{-1}$, which are functions inverse to each other, indicates correspondence of the pixel lines of the original image to the pixel lines of the processed image. Where the pixel line of the original image in question is duplicated or otherwise multiplicated by the enlargement processing so as to correspond to two or more pixel lines of the processed image, the $f_M(x_m)$ takes values indicating numerals of the two or more corresponding pixel lines (as in cases of, for example, $f_M(2)=2, 3$, $f_M(4)=5, 6$ in FIG. 3). Where the pixel line of the original image in question is deleted by the compression processing, the $f_M(x_m)$ takes value "0" indicative of absence of the corresponding pixel line in the processed image (as in cases of, for example, $f_M(3)=0$, $f_M(6)=0$ in FIG. 3).

Figure 4:
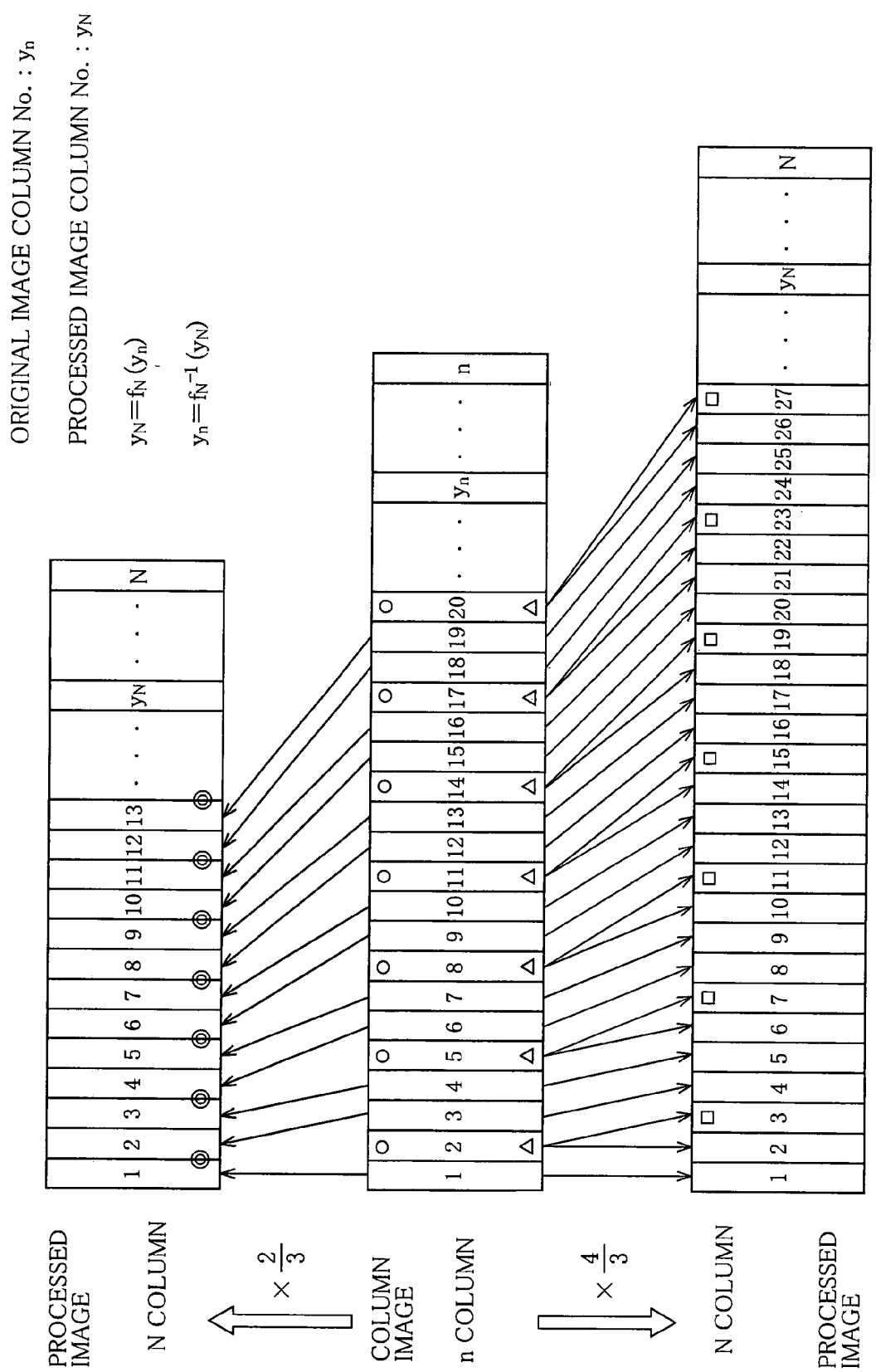
FIG. 4 is a view conceptually showing compression and enlargement of an image in the main scanning direction.

FIG. 4 shows, as examples of the compression and enlargement of the image in the main scanning direction, cases where the original image having the number m of pixel column is compressed and enlarged into the processed image having the number M of pixel columns with a compression ratio of 2/3 and an enlargement ratio of 4/3, respectively. In the compression processing, the pixel columns of the original image are thinned out according to a predetermined rule. In the enlargement processing, the pixel columns of the original image are interpolated according to a predetermined rule. Specifically described, in the case of the compressing processing with the compression ratio of 2/3, the pixel columns Nos. 2, 5, 8, 11, 14, 17, 20, . . . (that are marked with "○") of the original image are deleted so that the processed image has a matrix in which the pixel columns that used to exist between respective adjacent pairs of pixel columns (that are marked with "⊙") no longer exist. In the case of the enlarging processing with the enlargement ratio of 4/3, the pixel columns Nos. 2, 5, 8, 11, 14, 17, 20, . . . (that are marked with "Δ") of the original image are disposed as duplicated pixel columns Nos. 3, 7, 11, 15, 19, 23, 27, . . . (that are marked with "□") in the processed image.

As in the above-described compression and enlargement of the image in the sub-scanning direction, the rules (according to which the compressing and enlargement processings are performed) are defined by a pixel-correspondence indicative index in the form of column-correspondence functions $f_N$, $f_N^{-1}$ that vary depending on the compression and enlargement ratios. The column-correspondence functions $f_N$, $f_N^{-1}$ are expressed as follows:

$$y_N = f_N(y_n)$$

$y_n = f_N^{-1}(y_N)$, where "$y_n$" represents the numeral of the pixel column (pixel column No.) of the original image while "$y_N$" represents the numeral of the pixel column (pixel column No.) of the processed image. That is, each of the functions $f_N$, $f_N^{-1}$, which are functions inverse to each other, indicates correspondence of the pixel columns of the original image to the pixel columns of the processed image. Where the pixel column of the original image in question is duplicated or otherwise multiplicated by the enlargement processing so as to correspond to two or more pixel columns of the processed image, the $f_N(y_n)$ takes values indicating numerals of the two or more corresponding pixel columns (as in cases of, for example, $f_N(2)=2, 3, f_N(5)=6, 7$ in FIG. 4). Where the pixel column of the original image in question is deleted by the compression processing, the $f_N(y_n)$ takes value "0" indicative of absence of the corresponding pixel column in the processed image (as in cases of, for example, $f_N(2)=0, f_N(5)=0$ in FIG. 4).

In the image-data conversion performed by the image data processing device 10, a line counter $C_M$ and a column counter $C_n$ are employed. The line counter $C_M$ is operable to indicate the numeral of the subjected pixel line (that is currently subjected to the processing) of the processed image, namely, indicate a position of the subjected pixel line in the pixel matrix of the processed image. The column counter $C_n$ is operable to indicate the numeral of the subjected pixel column (that is currently subjected to the processing) of the original image, namely, indicate a position of the subjected pixel column in the pixel matrix of the original image. Further, in addition to the line counter $C_M$ and the column counter $C_n$ as primary counters, there are employed a line counter $C_m$ and a column counter $C_N$ as secondary counters. The line counter $C_m$ is operable to specify the pixel line of the original image that corresponds to the pixel line of the processed image indicated by the line counter $C_M$. The column counter $C_N$ is operable to specify the pixel column of the processed image that corresponds to the pixel column of the original image indicated by the column counter $C_n$. Each of the above-described line-correspondence functions $f_M$, $f_M^{-1}$ is used as the index indicative of correspondence of the line counter $C_M$ to the line counter $C_m$, while each of the column-correspondence functions $f_N$, $f_N^{-1}$ is used as the index indicative of correspondence of the column counter $C_N$ to the column counter $C_n$. With the processing being caused to proceed relying on the column-correspondence functions $f_N$, $f_N^{-1}$, the pixels of the same columns Nos. are deleted or added in the respective pixel lines, in spite of the above-described inversion of the processing direction of the line processing upon shifting of the subjected pixel line. That is, the pixel lines of the original image are the same to each other with respect to the columns Nos. of the deleted or added pixels.

[Construction of Image Data Processing Device]

Figure 5:
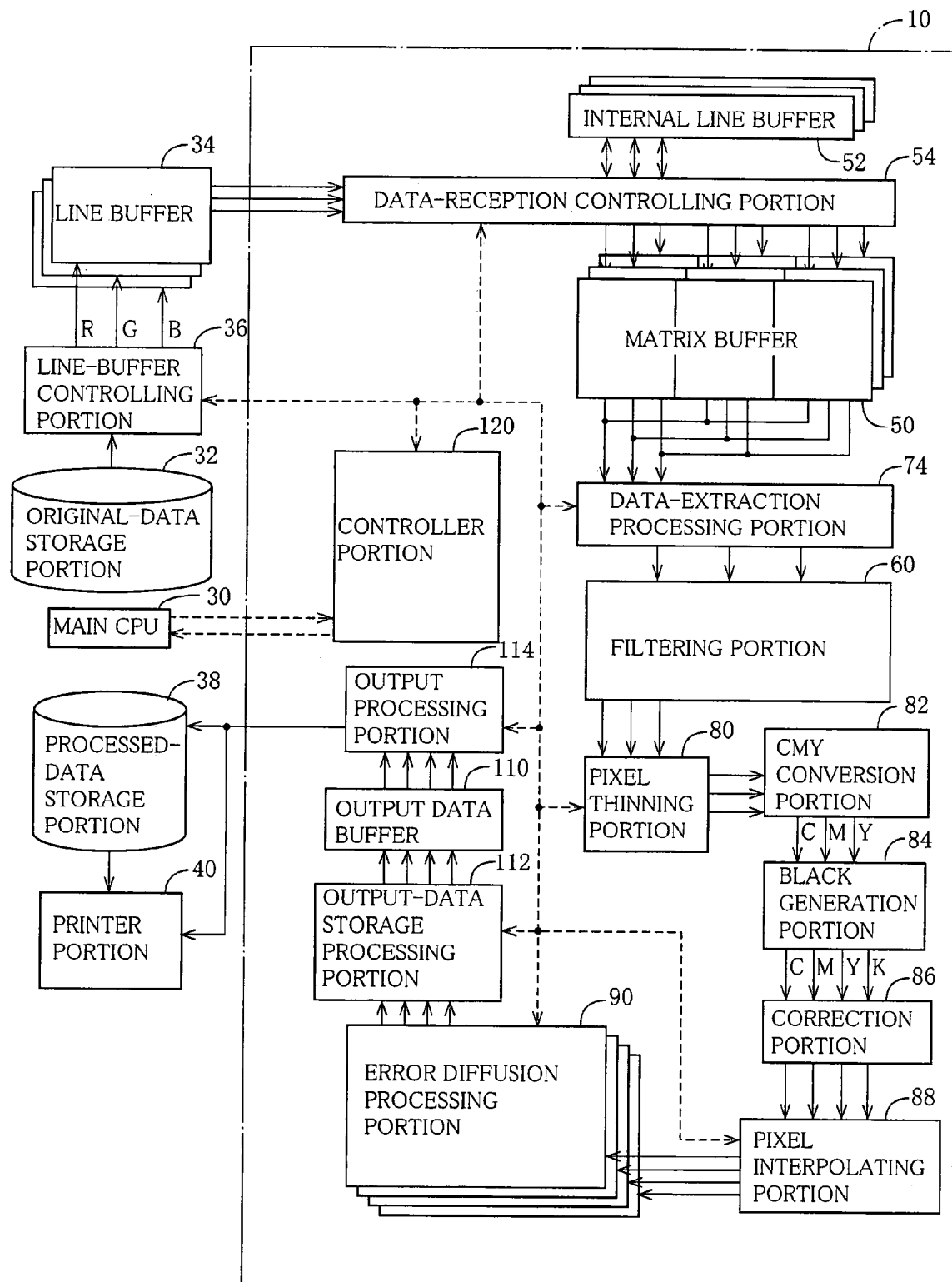
FIG. 5 is a block diagram showing construction of the image data processing device.

The image data processing device 10 is provided by an electronic circuit including a circuit plate and various electronic components disposed on the circuit plate. The image data processing device 10 is constructed as shown in FIG. 5, and is incorporated as a component in an inkjet printer. The inkjet printer includes, in addition to the processing device 10, a main CPU 30 for controlling various operations of the printer, an original-data storage portion 32 serving as a memory to store therein the original data representative of the original image; three external line buffers 34 each serving as a memory to temporarily store therein a part of the original data supplied to the processing device 10; a line-buffer controlling portion 36 for converting the original data in the form of serial data stored in the original-data storage portion 32, into parallel data, and controlling reception of the original data in the form of the parallel data by the three external line buffers 34; a processed-data storage portion 38 serving as a memory to store therein the processed data into which the original data has been converted by the processing device 10; and a printer portion 40 operable to form an real image on a recording medium based on the processed data that has been supplied from the processed-data storage portion 38 or the processing device 10. It is noted that, in FIG. 5, signal lines indicated by solid lines are those through which data signals are to be transferred while signal lines indicated by broken lines are those through which control or command signals are to be transferred.

The image data processing device 10 includes three matrix buffers 50 and three internal line buffers 52 such that each of the three matrix buffers 50 and each of the three internal line buffers 52 are provided for a corresponding one of the RGB intensity values. Each of the three matrix buffers 50 is arranged to temporarily store a part of the original data, while the three internal line buffers 52 are arranged to temporarily store a part of the original data that corresponds to two pixel line of the original image. Each of the matrix buffers 50 is provided to facilitate a filtering processing that is described below, and is provided by a memory having a capacity sufficiently large to store data of the target or subjected pixel and also data of the pixels neighboring to the target or subjected pixel. A data-reception controlling portion 54 is provided for receiving the original data from the external line buffers 34, storing the original data into the matrix buffers 50 and internal line buffers 52, and controlling transfer of the original data between the matrix buffers 50 and the internal line buffers 52. The data-reception controlling portion 54 has a function of selecting from which ones of the pixel lines the original data are to be received by the matrix buffers 50, so that the interpolation and thinning of the pixel lines, i.e., the compression and enlargement of the image in the sub-scanning direction are performed by the selection of the pixel lines. Further, the data-reception controlling portion 54 has a function of controlling an order in which data elements of respective pixels composing each pixel line are to be sequentially stored into each matrix buffer 50. That is, owing to this function of the data-reception controlling portion 54, the processing direction of the line processing is changed in the filtering processing and other processings following the filtering processing.

Figure 6:
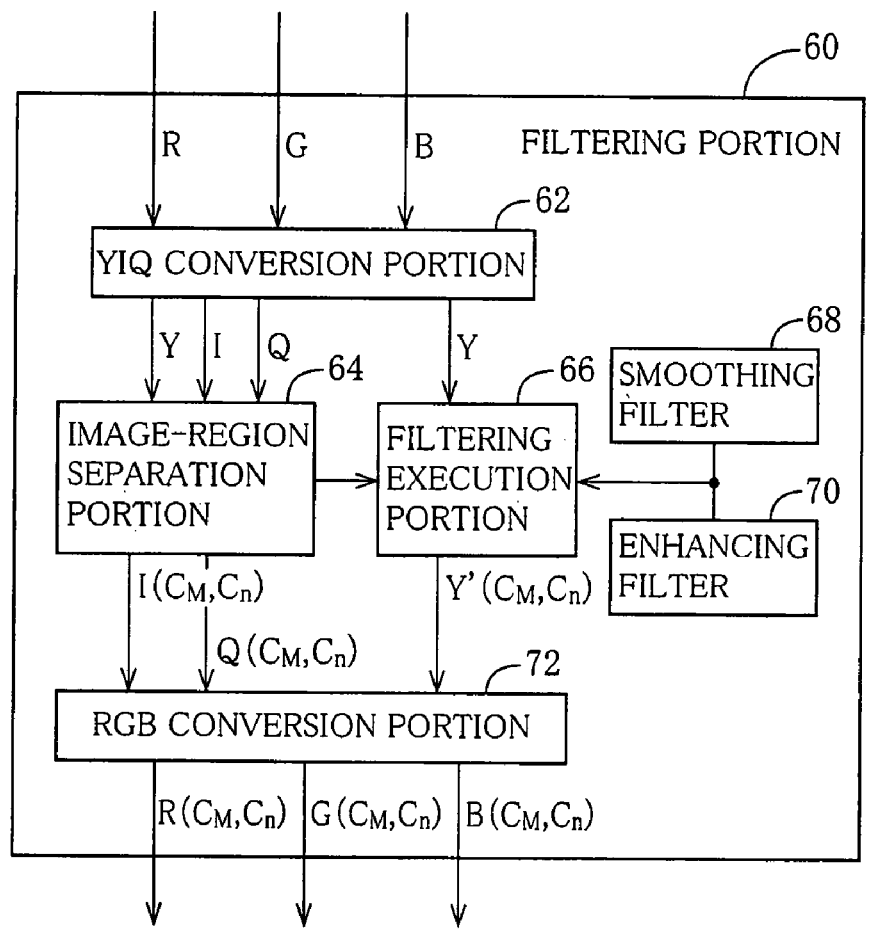
FIG. 6 is a block diagram showing construction of a filtering portion of the image data processing device.

The image data processing device 10 includes a filtering portion 60 as a circuit for performing the filtering processing. The filtering portion 60 performs the filtering processing for smoothing or enhancing the property values of the target pixel, in relation with the property values of the pixels neighboring to the target pixel. As shown in FIG. 6, the filtering portion 60 includes a YIQ conversion portion 62 for converting the RGB intensity values as the property values of each of the target and neighboring pixels, into Y brightness, I color difference and Q color difference; an image-region separation portion 64 for separating an image region based on the property values of the pixels that have been converted by the YIQ conversion portion 62; and a filtering execution portion 66 for smoothing or enhancing the Y brightness of the target pixel, based on output supplied from the image-region separation portion 64. The filtering execution portion 66 executes the filtering processing by using a selected one of a smoothing filter 68 and an enhancing filter 70 that are stored in the filtering portion 60. The filtering portion 60 further includes a RGB conversion portion 72 for converting the Y brightness of the target pixel (filtered by the filtering execution portion 66) and the I color difference and Q color difference of the target pixel (supplied via the image-region separation portion 64), back into the RGB intensity values of the target pixel. The filtering processing performed by the filtering portion 60 will be described later in detail. The image data supply to the filtering portion 60 is extracted from the matrix buffers 50 by a data-extraction processing portion 74, as shown in FIG. 5.

As shown in FIG. 5, the image data processing device 10 further includes a pixel thinning portion 80 for thinning out the pixels (deleting selected ones of the pixels) so as to compress the image in the main scanning direction; a CMY conversion portion 82 for converting the RGB intensity values of each of non-deleted pixels, into CMY density values; a black generation portion 84 for obtaining CMYK density values as the property values of the target pixel, by adding K (black) density value into the CMY density values; a γ correction portion 86 for performing γ correction onto each of the CMYK density values of the target pixel; and a pixel interpolating portion 88 for interpolating the pixels by repeatedly outputting selected ones of the pixels, so as to enlarge the image in the main scanning direction. The property-value data set of each pixel outputted by the pixel interpolating portion 88 are the property-value data set of each pixel that has been subjected to the compression or enlargement processing in the main scanning direction and sub-scanning direction, as needed, and are gradation-value data set relating to the CMYK density values of each pixel. The pre-multilevel processing portion of the image data processing device 10 is constituted by the above-described components denoted by references 50, 52, 54, 60, 62, 64, 66, 68, 70, 72, 74, 80, 82, 84, 86 and 88, which are functional portions functioning to carry out the procedure as described above.

Figure 7:
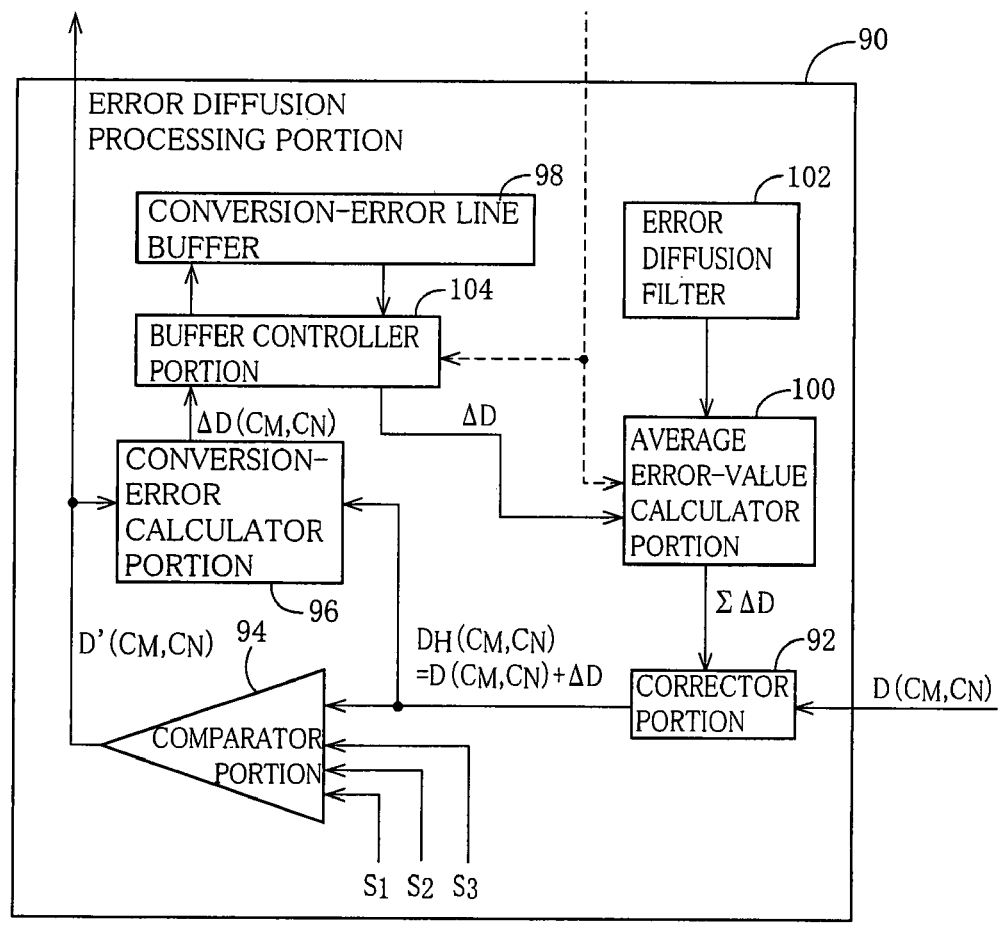
FIG. 7 is a block diagram showing construction of an error diffusion processing portion of the image data processing device.

The image data processing device 10 includes four error diffusion processing portions 90 as the multileveling processing portion for performing the multileveling processing onto the gradation-value data set relating to the CMYK density values of each pixel, which have been outputted from the pixel interpolating portion 88. Each of the four error diffusion processing portions 90 is provided for a corresponding one of the CMYK density values, and performs the multileveling processing according to the error diffusion technique. Each of the error diffusion processing portions 90 is provided by a circuit as shown in FIG. 7, and includes a corrector portion 92 for compensating or correcting the gradation value relating to a corresponding one of the CMYK density values of the target pixel, based on an average error value of the pixels neighboring to the target pixel, and a comparator portion 94 for compare the gradation value corrected by the corrector portion 92, with three threshold values $S_1, S_2, S_3$. The comparator portion 94 converts the corrected gradation value that has been compared with the three threshold values $S_1, S_2, S_3$, into a quaternary value as the multilevel value, and then outputs the quaternary value. Each error diffusion processing portion 90 further includes a conversion-error calculator portion 96 for calculating a conversion error value of the target pixel, based on the multilevel value outputted by the comparator portion 94 and the graduation value corrected by the corrector portion 92; a conversion-error line buffer 98 for temporarily storing therein the conversion error value; and an average error-value calculator portion 100 for calculating the average error value of the neighboring pixels by weighing and averaging the conversion error values of the neighboring pixels that are stored in the buffer 98. The average error value is a weighted average value of the conversion error values, and is calculated by using an error diffusion filter 102 indicative of a relationship between the position of each neighboring pixel relative to the target pixel and a weighting coefficient that is set for the each neighboring pixel. The transfer of the conversion error value between the conversion-error line buffer 98 and the conversion-error calculator portion 96 and between the conversion-error line buffer 98 and the average error-value calculator portion 100 is controlled by a buffer controller portion 104. It is noted that the multileveling processing performed by the error diffusion processing portion 90 will be described later in detail.

Referring back to FIG. 5, the image data processing device 10 further includes an output data buffer 110 as a memory for temporarily storing the multilevel-value data of each pixel that has been outputted from the four error diffusion processing portions 90. Since the processing direction along the main scanning direction is changed each time when the subjected pixel line is shifted from one to another, as described above, the multilevel-value data is stored into a storage region of the output data buffer 110, which region is determined based on the processing direction. This storage processing is performed by an output-data storage processing portion 112. The multilevel-value data constitutes a plurality of serial data sets each of which is serially outputted as a unit from the image data processing device 10. Each of the serial data sets is provided by the multilevel-value data of a plurality of pixels, and is made correspondent to the pixel line No. and pixel column No. of a first one of the plurality of pixels. This output processing is performed by an output processing portion 114. The image data processing device 10 further includes a controller portion 120 for controlling various processings performed by the image data processing device 10 such as control of the subject pixel line and the target pixel in the compression and enlargement processings in the main scanning and sub-scanning directions and change of the processing direction in the main scanning direction. The processings performed by the functional portions included in the processing device 10 are made in accordance with command signals issued by the controller portion 120.

[Process of Image Data Conversion Processing]

Figure 8:
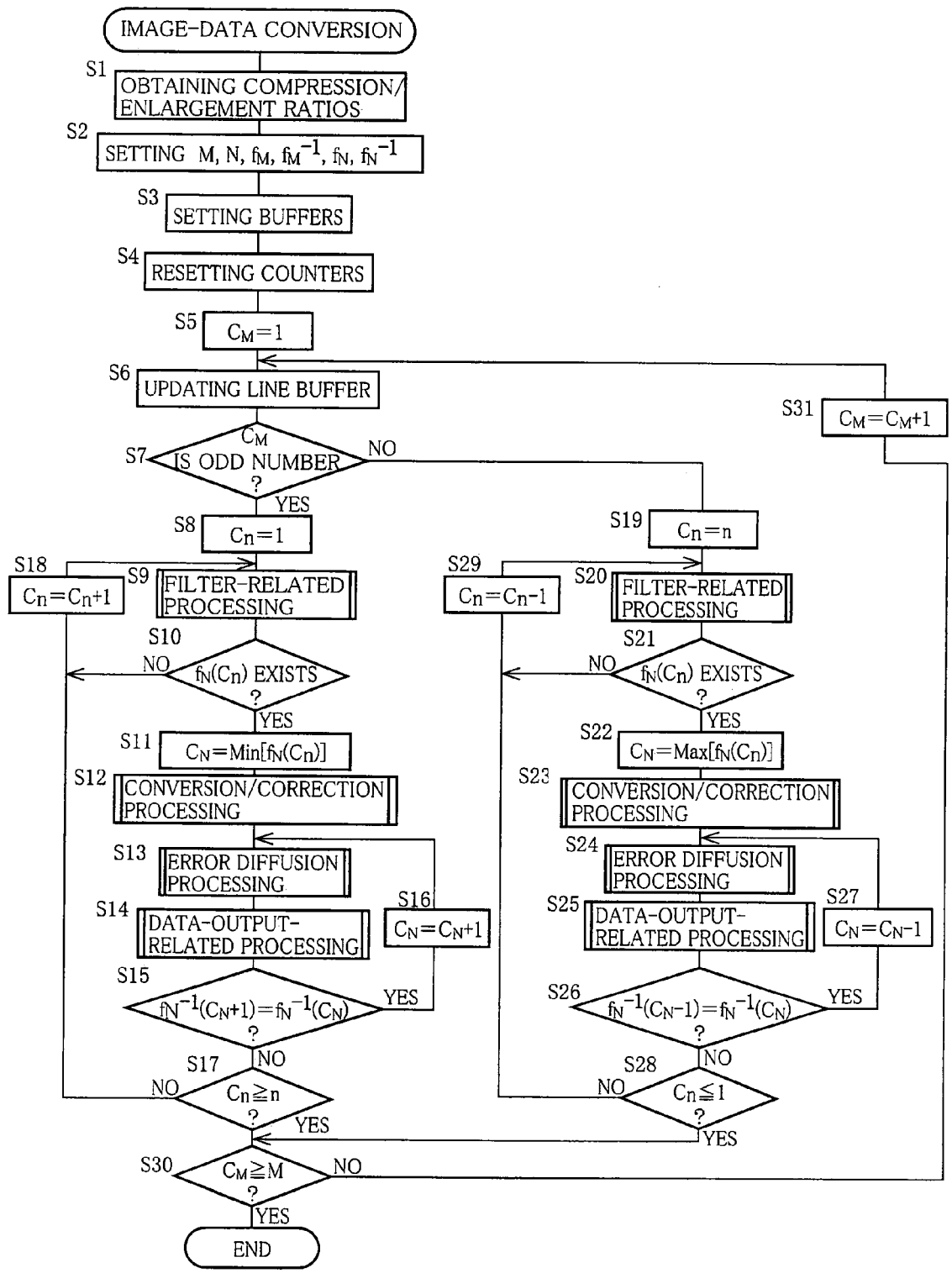
FIG. 8 is a flow chart showing an image-data conversion routine that is executed in the image data processing device.

Referring next to FIG. 8, there will be described a process of the image data conversion processing that is performed by the image data processing device 10, according to an image-data conversion routine that is represented by a flow chart of FIG. 8. Since the image data processing device 10 is constituted by an electronic circuit, two or more of sub-routines included in the image-data conversion routine are executed concurrently with each other. Thus, the image-data conversion routine is not necessarily executed precisely as shown in the flow chart of FIG. 8. The following description along the flow chart will be provided merely for the purpose of facilitating understanding of the image data conversion processing.

(i) Initial Processing

The image-data conversion routine is initiated with step S1 in which the controller portion 120 obtains, from the main CPU 30, the pixel-line number m and pixel-column number n of the original image and the compression or enlargement ratio of the processed image relative to the original image. Step S1 is followed by step S2 in which the controller portion 120 determines the pixel number M and pixel column number N of the processed image, the line-correspondence functions $f_M, f_M^{-1}$ and column-correspondence functions $f_N, f_N^{-1}$, based on the compression or enlargement ratio. Then, at step S3, the line buffers are set by the controller portion 120. Each of the internal line buffers 52 and conversion-error line buffers 98 that are included in the present image data processing device 10 has a plurality of storage lines each constituted by a plurality of storage columns. Similarly, each of the external line buffers 34 that are disposed outside the image data processing device 10 has a plurality of storage lines each constituted by plurality of storage columns. This step S3 is implemented to determine the number of the storage columns of each of the storage lines of the internal line buffers 52 and conversion-error line buffers 98, based on the pixel column number n of the original image and the pixel column number N of the processed image. Further, at this step S3, the number of the storage columns of each of the storage lines of the external line buffers 34 is determined based on the pixel column number n of the original image, and the number of the storage lines of the external line buffers 34 is determined based on the above-described compression and enlargement ratios. Step S3 is followed by step S4 that is implemented to reset the line counters $C_M$, $C_m$ and column counter $C_N$, $C_n$ (that are described above) and also reset a buffer counter CB (that is described below).

(ii) Updating of Line Buffers

At the subsequent step S5, the line counter $C_M$ counting the pixel lines of the processed image is set at "1" indicating a first one of the pixel lines, and then the line processing to which the first pixel line is subjected starts to be executed. The line counter $C_M$ is counted up when the execution of the line processing is completed for each pixel line, and the line processing is repeatedly executed until the line processing is completed for all the pixel lines of the processed image (S30). At step S6 that corresponds to a first step of the line processing, each external line buffer 34 is updated.

As shown in FIG. 9, each of the three external line buffers 34 is provided for storing the gradation-value data of a corresponding one of the RGB intensity values. The RGB intensity gradation-value data R $(x_m, y_n)$, G $(x_m, y_n)$, B $(x_m, y_n)$ is serially transmitted to the line-buffer controlling portion 36, and is converted into parallel data by the line-buffer controlling portion 36 when the RGB intensity gradation-value data is supplied to the external line buffers 34 from the original-data storage portion 32. Each of the external line buffers 34 is initially set to have a plurality of storage lines each having a storage area that corresponds to the pixel-column number n of the original image. Each external line buffer 34 is arranged to store therein the gradation-value data (hereinafter referred to as "pixel data elements" where appropriate) of a corresponding one of the RGB intensity values of the pixels composing at least five successive pixel lines of the original image. The gradation-value data relating each of the RGB intensity values is represented by a value ranging from 0 to 255, namely, one of a total of 256 values. Therefore, each of the pixel data elements is stored in a portion of the storage area that has a capacity of 8 bits.

Figure 9A:
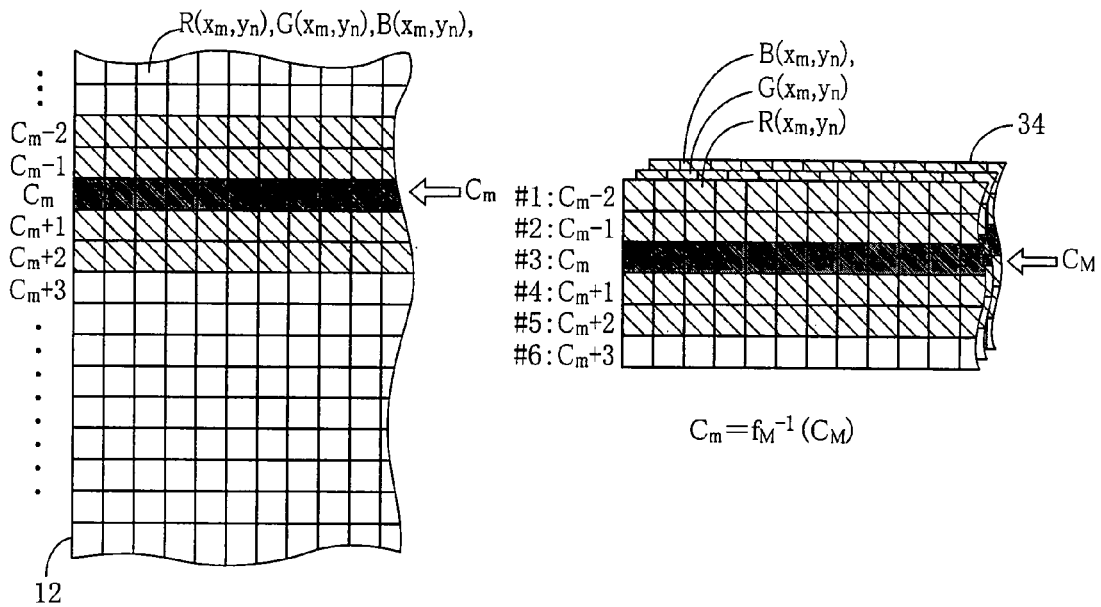
FIGS. 9A and 9B are views conceptually showing external line buffers that are provided outside the image data processing device to temporarily store therein an original data, and also updating of these external line buffers.

FIG. 9A shows a state in which six storage lines #1-#6 are provided in each of the external line buffers 34, under a condition that the image is neither compressed nor enlarged in the pixel line direction. Described more precisely, in the state shown in FIG. 9A, the processing has proceeded to a certain stage. In the line processing performed on one subjected pixel line (that is black-painted in FIG. 9A) of the processed image, the pixel data elements of a total of four pixel lines (which are located on opposite sides of the subjected pixel line and which are hatched in FIG. 9A) are required. To this end, the updating of each external line buffer 34 is performed such that the required pixel data elements are stored in the external line buffer 34. Specifically described, the subjected pixel line (hereinafter referred to as "pixel line $C_M$") of the processed image indicated by the line counter $C_M$ is made, by the line-correspondence function $f_M^{-1}$, correspondent to the subjected pixel line (hereinafter referred to as "pixel line $C_m$") of the original image indicated by the line counter $C_m$, and the pixel data elements of all the pixels composing the pixel line $C_m$, pixel line $(C_m-1)$ (i.e., last pixel line), pixel line $(C_m-2)$ (i.e., pixel line preceding the last pixel line), pixel line $(C_m+1)$ (i.e., next pixel line) and pixel line $(C_m+2)$ (i.e., pixel line following the next pixel line) are stored in the respective storage lines #1-#5 of each external line buffer 34, as shown in FIG. 9A. Further, as shown in FIG. 9A, the pixel data elements of all the pixels composing the pixel line $(C_m+3)$ (i.e., pixel line following the pixel line $(C_m+2)$) are stored in the storage line #6, in view of next counting-up of the line counter $C_M$.

Figure 9B:
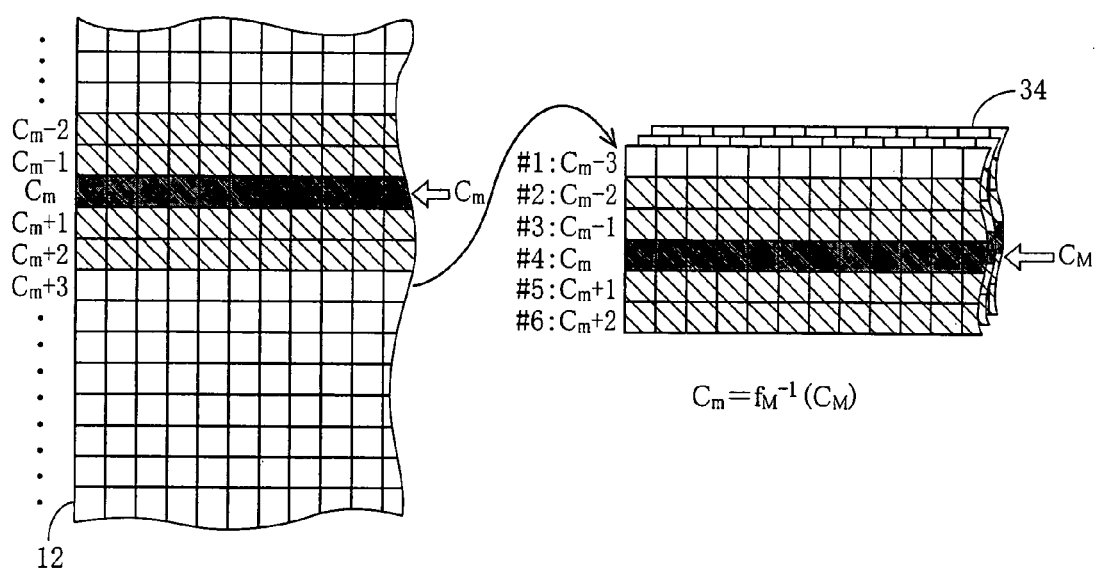

As the subjected pixel line of the processed image is shifted, the subjected pixel line of the original image is shifted, as shown in FIG. 9B. In this instance, the storage lines storing the required pixel data elements are changed from the storage lines #1-#5 to the storage lines #2-#6. As a result of this change, the pixel data elements of the pixels composing the pixel line $(C_m+3)$ (i.e., pixel line following the pixel line $(C_m+2)$), which will be required upon further counting-up of the line counter $C_M$, are read out from the original-data storage portion 32, and are then stored in the storage line #1 that is no longer required to store the pixel data elements required for the currently executed line processing. The updating of each external line buffer 34 is thus made each time when the line counter $C_M$ is counted up. The controller portion 120 grasps the pixel data elements of which one of the pixel lines of the original image are to be stored or are being currently stored in each of the storage lines of each external line buffer 34. Therefore, the updating of each external line buffer 34 is made in accordance with command signals issued by the controller portion 120.

There has been described a case where the compression and enlargement processings in the pixel-column direction (i.e. sub-scanning direction) are not performed. However, where the enlargement processing is performed, for example, the pixel line $C_m$ (indicated by the line counter $C_m$) is not necessarily changed each time when the line counter $C_M$ (indicated by the line counter $C_M$) is counted up. When the pixel line $C_m$ remains unchanged in spite of counting-up of the line counter $C_M$, the updating processing is not substantially performed. On the other hand, where the compression processing is performed, for example, the pixel line $C_m$ is changed to the next pixel line or sometime to the pixel line following the next pixel line each time when the line counter $C_M$ is counted up. Therefore, where the compression processing is performed, the number of the storage lines is set at seven or more in the initial setting of each of the external line buffers 34, and the pixel data elements of two or more pixel lines are updated upon counting-up of the line counter $C_M$ which causes thinning of the pixel lines of the original image.

In the initial setting of the external line buffers 34 at step S3, the number of the storage lines (in which the original image is to be stored) and the number of storage cells (which composes each of the storage lines) are determined. In the updating of the external line buffers 34, when the value of the line counter $C_m$ corresponding to the line counter $C_M$ is "1" or "2", namely, when the pixel lines $(C_m-1)$, $(C_m-2)$ or the pixel line $(C_m-2)$ does not exist in the original image, the pixel data elements of the pixel line 1 are duplicated so as to be stored as those of the pixel lines $(C_m-1)$, $(C_m-2)$ or the pixel line $(C_m-2)$ in each external line buffer 34. Similarly, when the value of the line counter $C_m$ is "m" or "$(m^{-1})$", namely, when the pixel lines $(C_m+1)$, $(C_m+2)$ or the pixel line $(C_m+2)$ does not exist in the original image, the pixel data elements of the pixel line m are duplicated so as to be stored as those of the pixel lines $(C_m+1)$, $(C_m+2)$ or the pixel line $(C_m+2)$ in each external line buffer 34.

(iii) Change of Direction of Line Processing

After the updating of the external line buffers 34, step S7 is implemented to determine whether the value of the line counter $C_M$ is an odd or even number. When the subjected pixel line is an odd-numbered line, the line processing proceeds in a forward direction, namely, the image data conversion processing (that is sequentially performed onto the pixels composing the subjected pixel line) proceeds in a direction away from the pixel located in a smaller-numbered column of the pixel matrix toward the pixel located in a larger-numbered column of the pixel matrix. When the value of the line counter $C_M$ is an odd number, an affirmative decision (YES) is obtained at step S7, and then step S8 is implemented to set the column counter $C_n$ (arranged to based on the original image)

at "1". Step S8 is followed by step S9 and the subsequent steps. That is, the pixel-unit processing, which is executed for the target pixel located in the column indicated by the column counter $C_n$, proceeds while the column counter $C_n$ is counted up (S18) until the conversion processing performed on the pixel of the largest-numbered column is completed (S17). On the other hand, when the subjected pixel line is an even-numbered line, the line processing proceeds in a reverse direction, namely, the image data conversion processing (that is sequentially performed on the pixels composing the subjected pixel line) proceeds in a direction away from the pixel located in a larger-numbered column of the pixel matrix toward the pixel located in a smaller-numbered column of the pixel matrix. When the value of the line counter $C_M$ is an even number, a negative decision (NO) is obtained at step S7, and then step S19 is implemented to set the column counter $C_n$ at "n". Step S19 is followed by step S20 and the subsequent steps. That is, the pixel-unit processing, which is executed for the target pixel located in the column indicated by the column counter $C_n$, proceeds while the column counter $C_n$ is counted down (S29) until the conversion processing performed on the pixel of the smallest-numbered column is completed (S28).

The controller portion 120 serves as a line-processing direction controller for counting-up the line counter $C_M$, determining the processing direction of the line processing based on the value of the line counter $C_M$ (namely, determining whether the column counter $C_n$ is to be counted up or down), and controlling the image data conversion performed on each pixel based on the value of the column counter $C_n$ that is counted up or down. There will be described the pixel-unit processing in detail where the line processing is executed with the processing direction being changed each time the subjected pixel line is shifted from one to another. In the present embodiment, steps S7, S8, S17, S18, S19, S28, S29 cooperate to constitute a line-processing direction controlling step, and steps S10, S11, S15, S16, S18, S21, S22, S26, S27, S29 cooperate to constitute a pixel-number change controlling step.

(iv) Filter-Related Processing

Figure 10:
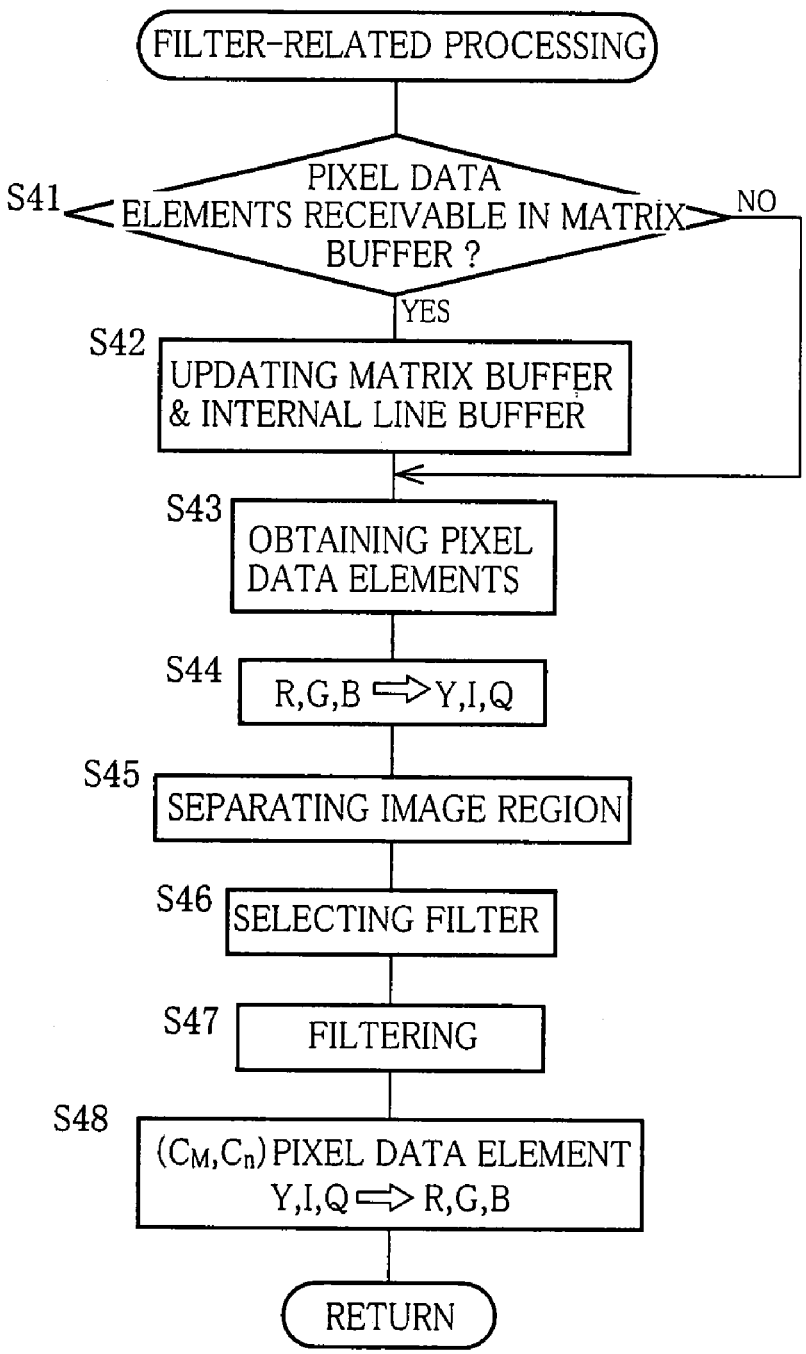
FIG. 10 is a flow chart showing a filter-related processing, which is executed as a sub-routine of the image-data conversion routine of FIG. 8.

At step S9 or step S20 as an initial step of the pixel unit processing, a filter-related processing as one of the sub-routines of the image-data conversion routine is executed, as shown in a flow chart of FIG. 10. The sub-routine is initiated with step S41 that is implemented to determine whether the pixel data elements supplied from the external line buffers 34 are receivable in the matrix buffers 50. If the pixel data elements are receivable in the matrix buffers 50, the control flows goes to step S42 in which the matrix buffers 50 and internal line buffers 52 are updated.

Like the external line buffers 34, each of the three matrix buffers 50 and each of the three internal line buffers 52 are provided for a corresponding one of the RGB intensity values as the gradation-value data, so that each of the three matrix buffers 50 and each of the three internal line buffers 52 are arranged to store therein the pixel data elements that had been stored in a corresponding one of the three external line buffers 34, i.e., the gradation-value data of each pixel relating a corresponding one of the RGB intensity values. Each of the matrix buffers 50 is sectioned into three storage blocks #1-#3 each of which is arranged to store therein the pixel data elements of 20 pixels (5 lines×4 columns). Each of the internal line buffers 52 is sectioned into two storage lines #1, #2 each of which is arranged (in the initial setting at step S3 described above) to store therein the pixel data elements of pixels whose number corresponds to the number n of pixel columns of the original image.

Figure 11:
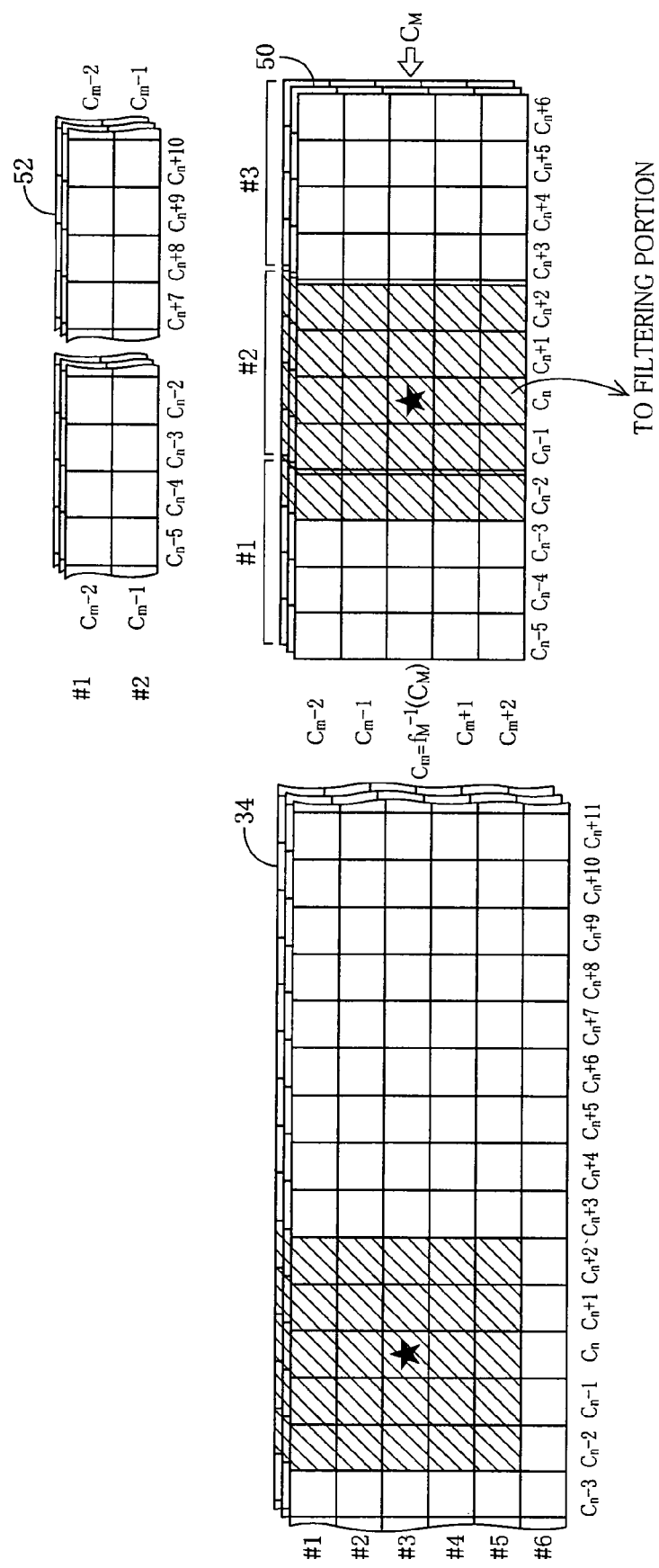
FIG. 11 is a view conceptually showing a state of matrix buffers included in the image data processing device, in which a line processing proceeds in a forward direction.

To each of the matrix buffers 50, the pixel data elements required for the filtering processing (that is described below) are accessible, so that the required pixel data elements are stored in each matrix buffer 50. The required pixel data elements are the pixel data elements of 25 pixels (5 lines×5 columns) including the target pixel $C_n$ which composes the pixel line $C_m$ corresponding to the pixel line $C_M$ as the subjected pixel line and which is located in the center of the 25 pixels. FIG. 11 shows a state of the matrix buffers 50 in which the line processing performed on the subjected pixel line $C_M$ in the forward direction has proceeded to a certain stage while the external line buffers 34 is in the state shown in FIG. 9A. In FIG. 11, the storage column that currently stores therein the pixel data element of the target pixel is marked with "★", while the storage columns that currently store therein the pixel data elements of the 25 pixels (which include the target pixel located in the center thereof) are hatched. That is, the hatched storage columns currently store therein the pixel data elements that are used for the filtering processing. In the state shown in FIG. 11, the used pixel data elements are those located in a region bridging the storage blocks #1 and #2. Specifically described, the used pixel data elements are those of the pixels located in a region of the original image in which the pixel lines ($C_m$-2), ($C_m$-1), $C_m$, ($C_m$+1), ($C_m$+2) overlap with the pixel columns ($C_n$-2), ($C_n$-1), $C_n$, ($C_n$+1), ($C_n$+2). Each of the internal line buffers 52 stores, in the storage lines #1, #2, the pixel data elements of the pixels composing the pixel line ($C_m$-2) (i.e., the pixel line preceding the last pixel line) and the pixel line ($C_m$-1) (i.e., the last pixel line) or the pixel line ($C_m$-1) and the target pixel line $C_m$, depending on progress of the line processing.

Figure 12:
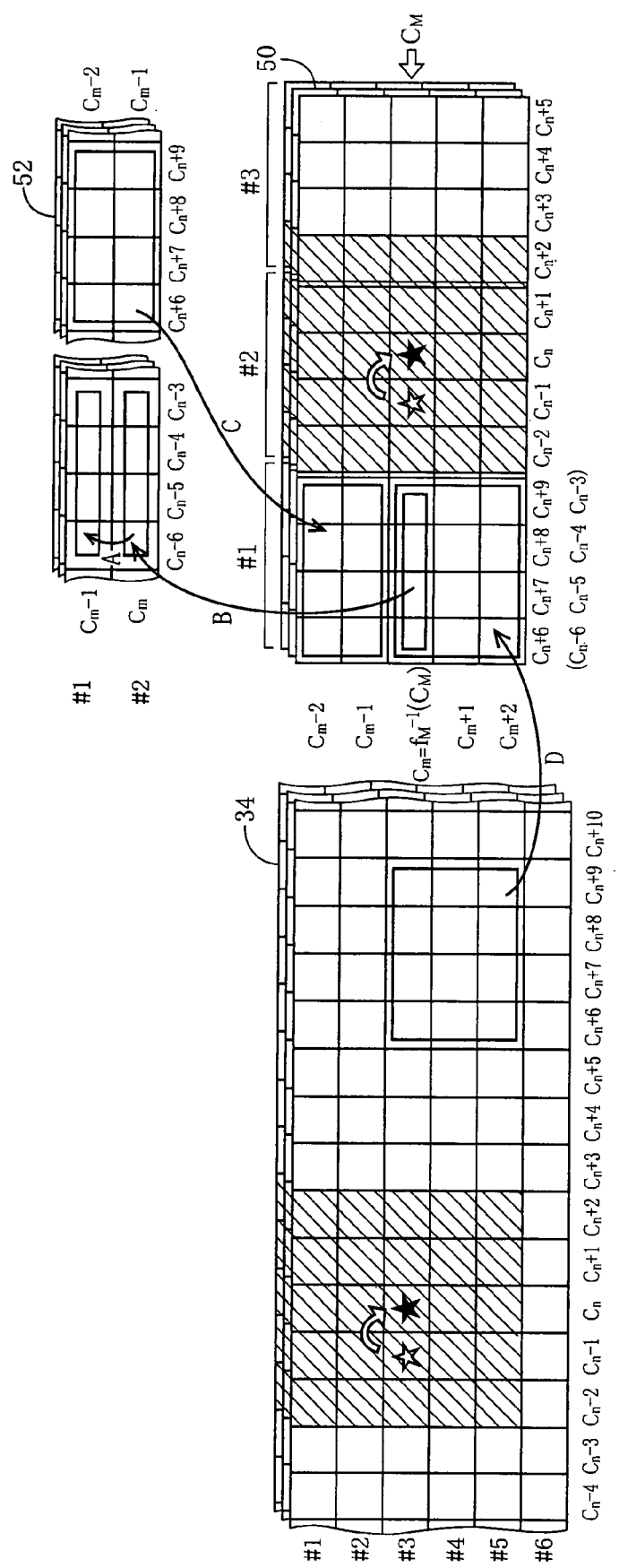
FIG. 12 is a view conceptually showing updating of the matrix buffers of FIG. 11 where the line processing proceeds in the forward direction.

When the column counter $C_n$ is counted up in the line processing proceeding in the forward direction, the target pixel is changed in each external line buffer 34 and each matrix buffer 50, as shown in FIG. 12. In the illustrated case, as a result of change of the target pixel, the used pixel data elements are stored in a region bridging the storage blocks #2 and #3, and the pixel data elements stored in the storage block #1 are no longer used in the present line processing. When there exists a storage block storing only the pixel data elements that are no longer required, each matrix buffer 50 is updated. More specifically described as to the illustrated case, as a result of counting-up of the column counter $C_n$, the pixel data elements stored in the storage block #1 of each matrix buffer 50 become the pixel data elements of the pixels located in four pixel columns ($C_n$-6), ($C_n$-5), ($C_n$-4), ($C_n$-3). In this instance, among the pixel data elements of the pixels of the last line ($C_m$-1) stored in the storage line #2 of each internal line buffer 52, the pixel data elements of the pixels located in the above-described four pixels columns ($C_n$-6), ($C_n$-5), ($C_n$-4), ($C_n$-3) are transferred into the corresponding four storage columns of the storage line #1 (see arrow A in FIG. 12), and the pixel data elements of the four pixels of the pixel line $C_m$ stored in the storage block #1 of each matrix buffer 50 are transferred into the corresponding four storage columns of the storage line #2 of the corresponding internal line buffer 52 (see arrow B in FIG. 12), whereby each internal line buffer 52 is partially updated. Next, the pixel data elements of four pixel columns ($C_n$+6), ($C_n$+7), ($C_n$+8), ($C_n$+9) of the pixel lines ($C_m$-2), ($C_m$-1) that are stored in the storage lines #1, #2 of each internal line buffer 52 are transferred as the pixel data elements required for the next processing, into the corresponding two storage lines of the storage block #1 of the corresponding matrix buffer 50 (see arrow C in FIG. 12). Then, the pixel data elements of the pixels of the four pixel columns ($C_n$+6), ($C_n$+7), ($C_n$+8), ($C_n$+9) of the pixel lines $C_m$, ($C_m$+1), ($C_m$+2) that are, stored in the storage lines #3-#5 of each external line buffer 34 are transferred into the corresponding three storage lines of the storage block #1 of the corresponding matrix buffer 50 (see arrow D in FIG. 12).

Figure 13:
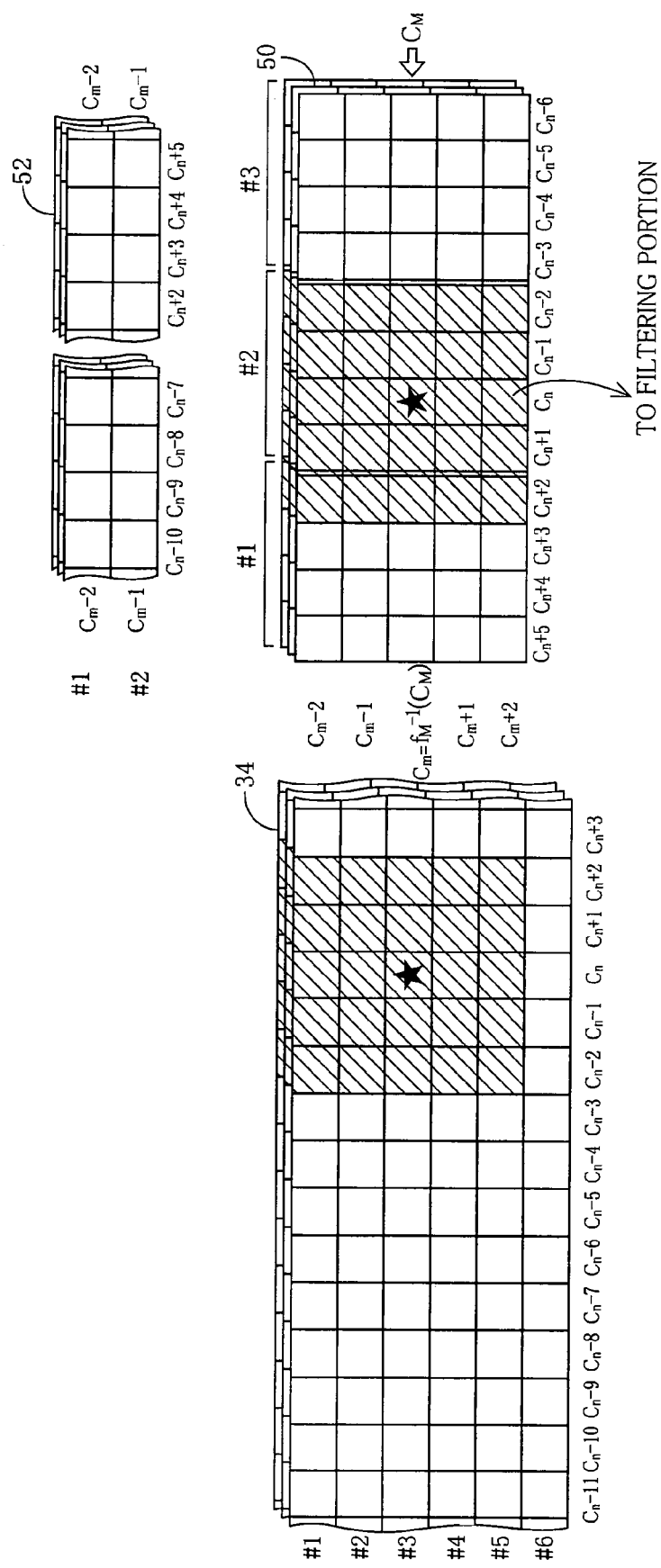
FIG. 13 is a view conceptually showing a state of the matrix buffers included in the image data processing device, in which the line processing proceeds in a reverse direction.
Figure 14:
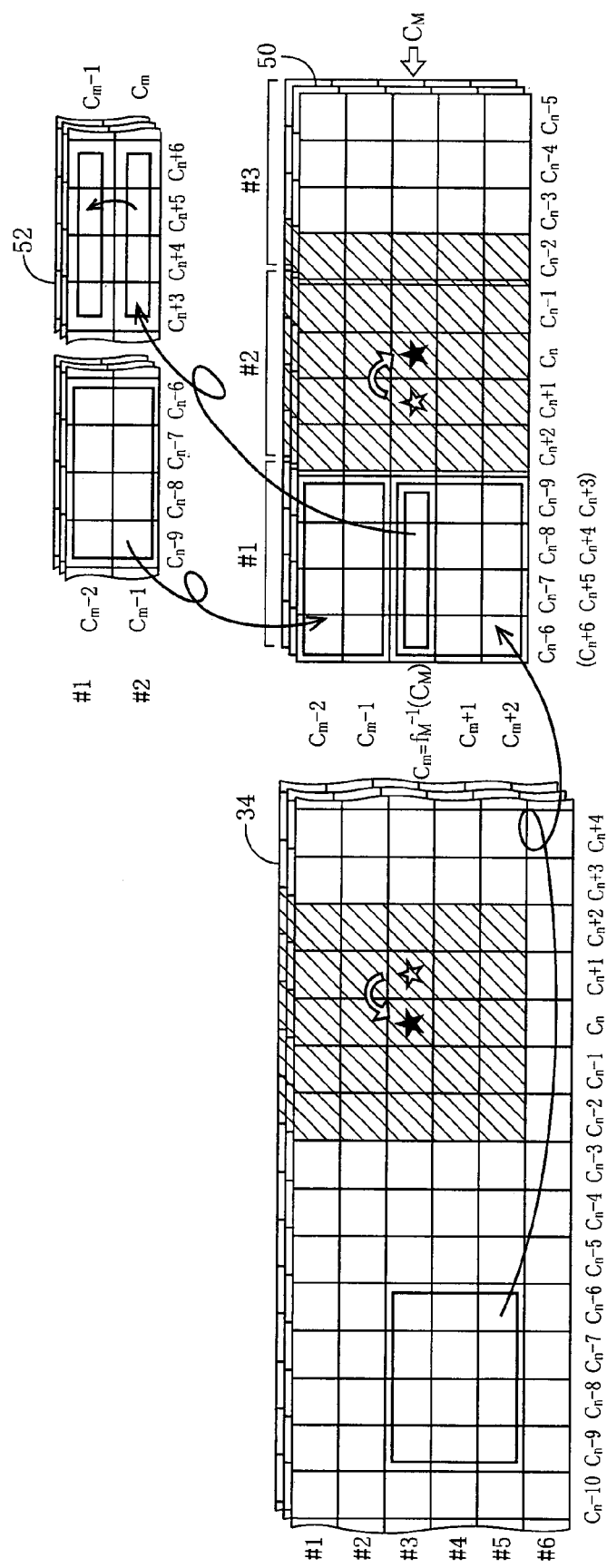
FIG. 14 is a view conceptually showing updating of the matrix buffers of FIG. 13 where the line processing proceeds in the reverse direction.

In the line processing proceeding in the reverse direction, the pixel data elements are stored in each matrix buffer 50 and each internal line buffer 52 in a state as shown in FIG. 13. Unlike in the line processing proceeding in the forward direction, the pixel data elements stored in each matrix buffer 50 are reversely arranged in the line direction. In the updating process, since the column counter $C_n$ is counted down, the target pixel is shifted in the reverse direction in each external line buffer 34, as shown in FIG. 14. However, in each matrix buffer 50, the target pixel is shifted in the same direction as in the line processing proceeding in the forward direction. In the line processing in the reverse direction in which the pixel data elements stored in each matrix buffer 50 are arranged in the reverse direction, the pixel data elements are transferred between each external line buffer 34 and the corresponding matrix buffer 50 and between each internal line buffer 52 and the corresponding matrix buffer 50, as shown in FIG. 14, such that the direction of arrangement of the pixels is inverted.

As described above, the updating of each matrix buffer 50 is made by utilizing the pixel data elements stored in the corresponding internal line buffer 52. When the subjected pixel line is shifted in response to counting-up of the line counter $C_M$, the pixel data elements of the pixel line $(C_m-2)$ (i.e., the pixel line preceding the last pixel line) and the pixel line $(C_m-1)$ (i.e., the last pixel line) stored in each internal line buffer 52 are transferred into the corresponding matrix buffer 50, while only the pixel data elements of three pixel lines are transferred from each external line buffer 34 into the corresponding matrix buffer 50. Since each external line buffer 34 is a SDRAM (synchronous dynamic random access memory) located outside the image data processing device 10, the transfer of the pixel data elements therefrom to the corresponding matrix buffer 50 requires a relatively large length of time. In the present image data processing device 10, the processing speed of the image data conversion is increased owing to the utilization of each internal line buffer 52 in the supply of the pixel data elements to the corresponding matrix buffer 50.

In the above-described case of updating of the matrix buffers 50 and the internal line buffers 52, the compression and enlargement processings in the pixel-column direction are not performed. When the pixel lines are thinned out by performance of the compression processing in the pixel-column direction, the transfer of the pixel data elements from each internal line buffer 52 to the corresponding matrix buffer 50 is not made at all or is made only by an amount corresponding to a single pixel line, while the transfer of the pixel data elements from each external line buffer 34 to the corresponding matrix buffer 50 is made by an amount corresponding to four or five pixel lines. Further, in case of performance of the enlargement processing as well as in case of performance of the compression processing, the subjected pixel line of the original image sometimes remains unchanged even with counting-up of the line counter $C_M$. In such an event, the updating processing is performed as the same as in the last execution of the line processing.

In the updating processing, where the value of the line counter $C_m$ corresponding to the line counter $C_M$ is 1 or 2, or where the value of the line counter $C_m$ is m or (m−1), the pixel data elements of the pixel line 1 or m are duplicatedly used, as in the updating of each external line buffer 34. Further, when the value of the column counter $C_n$ is 1 or 2, namely, when the pixel columns $(C_n-1)$, $(C_n-2)$ or the pixel column $(C_n-2)$ does not exist in the original image, the pixel data elements of the pixel column 1 are duplicatedly used as those of the pixel columns $(C_n-1)$, $(C_n-2)$ or the pixel column $(C_n-2)$. Similarly, when the value of the column counter $C_n$ is n or (n−1), namely, when the pixel columns $(C_n+1)$, $(C_n+2)$ or the pixel column $(C_n+2)$ does not exist in the original image, the pixel data elements of the pixel column n are duplicatedly used as those of the pixel columns $(C_n+1)$, $(C_n+2)$ or the pixel column $(C_n+2)$.

The above-described updating of the matrix buffers 50 and internal line buffers 52, namely, the transfer of the image data between each matrix buffer 50 and the corresponding internal line buffer 52 and external line buffer 34 is made by the data-reception controlling portion 54. The controller portion 120 grasps the pixel data elements of which one of the pixel lines or columns of the original image are to be stored or are being currently stored in each storage region of each external line buffer 34, matrix buffer 50 and internal line buffer 52. Therefore, the updating is made by the data-reception controlling portion 54 in accordance with command signals issued by the controller portion 120.

As described above, in the reception of the pixel data elements into each matrix buffer 50 under control of the data-reception controlling portion 54, each matrix buffer 50 receives the pixel data elements of five pixel lines of the original image including the pixel line $C_m$ (corresponding to the pixel line $C_M$ of the processed image) and four pixel lines located on opposite sides of the pixel line $C_n$, in response to counting-up of the line counter $C_M$. In this instance, the pixel line $C_m$ of the original image is determined based on the pixel line $C_M$ of the processed image and according to the line-correspondence function $f_M^{-1}$. Therefore, in the data reception using the function $f_M^{-1}$, where the pixel lines are thinned out or interpolated in the pixel-column direction (i.e., sub-scanning direction), the thinning or interpolation of the pixel lines is automatically made. That is, the data-reception controlling portion 54, which controls the reception of the pixel data elements by relying on the line-correspondence function $f_M^{-1}$, functions as a line thinning/interpolating portion for thinning out and interpolating the pixel lines so as to compress and enlarge the image in the sub-scanning direction.

Irrespective of whether the above-described updating of each matrix buffer 50 is made or not, in the filter-related processing shown in FIG. 10, the target pixel is shifted upon counting-up or counting-down of the column counter $C_n$, and step S43 is implemented to extract the pixel data elements from each matrix buffer 50, and to cause the extracted pixel data elements to be received by the filtering portion 60. The pixel data elements extracted from each matrix buffer 50 and received by the filtering portion 60 are those used for performing the filtering processing onto the shifted target pixel, and are provided by the pixel data elements of the target pixel (hereinafter referred to as "target pixel $(C_M, C_n)$" where appropriate)" and the neighboring pixels neighboring to the target pixel. Each of the pixel data elements is the gradation-value data relating to a corresponding one of the RGB intensity values. It is noted that step S43 is implemented by the data-extraction processing portion 74 in accordance with command signals issued by the controller portion 120.

At the subsequent step S44, the RGB intensity gradation-value data sets of the target pixel $(C_M, C_n)$ and the neighboring pixels are converted by the YIQ conversion portion 62 included in the filtering portion 60, into YIQ pixel data sets, i.e., the pixel data set relating to the Y brightness, I color difference and Q color difference of each pixel. Step S44 is followed by step S45 that is implemented to separate the image region based on the YIQ pixel data sets. The image-separation processing is, briefly described, a processing for determining if the target pixel is located in portions corresponding to edges of the image, and a filter to be used in the filtering processing is selected based on the determination. Specifically described, at the subsequent step S46, the smoothing filter 68 is selected for smoothing the property values of the target pixel and the neighboring pixels if the target pixel is not located in the portions corresponding to the edges of the image, and the enhancing filter 70 is selected for enhancing the property values of the target pixel and the neighboring pixels if the target pixel is located in the portions corresponding to the edges.

After the selection of the filter as described above, step S47 is implemented whereby the filtering processing is executed by the filtering execution portion 66, with respect to Y brightness data of the target pixel and the neighboring pixels. The pixels used for the filtering processing are 25 pixels (5 lines×5 columns) including the target pixel ($C_M$, $C_n$) that is located in the center of the 25 pixels. Each of the smoothing filter 68 and the enhancing filter 70 is provided by a matrix filter in which coefficients (predetermined for the respective pixels) are arranged in a matrix of 5 lines×5 columns. The filtering processing is executed by an operation according to the following expression 1:

$$Y'(C_M, C_n) = \frac{\sum_{i=C_M-2}^{C_M+2} \sum_{j=C_n-2}^{C_n+2} \{Y(i,j) \times n(i,j)\}}{\sum_{i=C_M-2}^{C_M+2} \sum_{j=C_n-2}^{C_n+2} n(i,j)} \quad \text{[Expression 1]}$$

where

Y (i, j) represents pixel data element of each pixel, n (i, j) represents filtering coefficient for each pixel.

As a result of the operation according the expression 1, it is possible to obtain Y brightness value Y' ($C_M$, $C_n$) of the target pixel ($C_M$, $C_n$) that has been subjected to the filtering processing. In the smoothing filter 68, the filtering coefficients are set for the respective pixels, as shown in FIG. 15A. In the enhancing filter 70, the filtering coefficients are set for the respective pixels, as shown in FIG. 15B. After the execution of the filtering processing, an inversion processing is performed by the RGB conversion portion 72 at step S48, whereby the I color difference value I ($C_M$, $C_n$) and Q color difference value Q ($C_M$, $C_n$) of the target pixel ($C_M$, $C_n$) and the Y brightness value Y' ($C_M$, $C_n$) of the target pixel ($C_M$, $C_n$) (that has been obtained by the filtering processing) are converted into R intensity value R ($C_M$, $C_n$), G intensity value G ($C_M$, $C_n$) and B intensity value B ($C_M$, $C_n$). The filtering processing is thus performed on the target pixel, and the gradation-value data relating to the RGB intensity values of the target pixel is outputted from the filtering portion 60.

(v) Pixel Thinning

After the filter-related processing as one of the sub-routines of the image-data conversion routine has been executed at step S9 or step S20, the control flow goes to step S10 or step S21 that is implemented to determine whether the pixel column $C_N$ (corresponding to the pixel column $C_n$ of the original image) exists in the processed image, based on the value of the column counter $C_n$ (counting the pixel column of the original image) and according to the column-correspondence function $f_N$. Where the pixel column $C_n$ of the original image is a pixel column that is to be deleted by compression of the image in the main scanning direction, $f_N(C_n)$ is "0" thereby meaning that the corresponding pixel column $C_N$ does not exist. In this case, the control flow goes to step S18 or step S29. That is, where the line processing is proceeding in the forward direction, step S18 is implemented to count up the column counter $C_n$, and then the filter-related processing is performed onto the next target pixel. Similarly, where the line processing is proceeding in the reverse direction, step S29 is implemented to count down the column counter $C_n$, and then the filter-related processing is performed onto the next target pixel. That is, in case of absence of the corresponding pixel column $C_N$ in the processed image, the pixel data elements of the target pixel that have been obtained by the filter-related processing are discarded herein, without the pixel data elements being utilized for further execution of the image data conversion processing. The thinning of the pixels is thus performed.

On the other hand, in case of presence of the corresponding pixel column or columns $C_N$ in the processed image, namely, in case of no deletion of the pixel column $C_n$ of the original image, the control flow goes to step S11 and the subsequent steps, or to step S22 and the subsequent steps. Described specifically, where the line processing is proceeding in the forward direction, Min [$f_N(C_n)$] (i.e. the minimum value of the $f_N(C_n)$) is set at a value indicated by the column counter $C_N$ (arranged to be based on the matrix) at step S11. That is, it is recognized that the currently performed pixel-unit conversion processing is a processing performed on the smallest-numbered one of the corresponding pixel columns (i.e., one having the smallest column No. among the corresponding pixel columns). On the other hand, where the line processing is proceeding in the reverse direction, Max [$f_N(C_n)$] (i.e. the maximum value of the $f_N(C_n)$) is set at a value indicated by the column counter $C_N$ at step S22. That is, it is recognized that the currently performed pixel-unit conversion processing is a processing performed on the largest-numbered one of the corresponding pixel columns (i.e., one having the largest column No. among the corresponding pixel columns). Each of the steps S1, S22 is provided in view of possible existence of two or more corresponding pixel columns (corresponding to each one of the pixel columns of the original image) in the processed image in case of the enlargement processing in the main-scanning direction, and is implemented to specify one of the two or more corresponding pixel columns that is to be subjected to the conversion processing.

The above-described steps S9, S10, S21 and S22 are implemented by the pixel thinning portion 80 in accordance with command signals issued by the controller portion 120. In case of no deletion of the pixel column $C_n$ of the original image, the pixel data elements supplied from the filtering portion 60 and inputted into the pixel thinning portion 80 are outputted as the pixel data elements of the target pixel ($C_M$, $C_N$) whose position is indicated by the line counter $C_M$ and column counter $C_N$.

(vi) Conversion and Correction Processing

Figure 16:
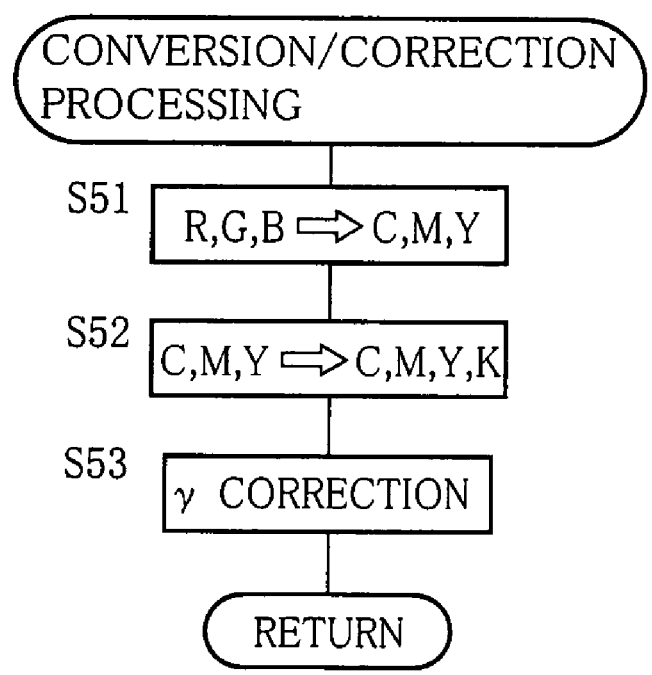
FIG. 16 is a flow chart showing a conversion/correction processing, which is executed as a sub-routine of the image-data conversion routine of FIG. 8.

After the processing performed by the pixel thinning portion 80, step S12 or S23 is implemented to perform a conversion/correction processing as one of the sub-routines of the image-data conversion routine, so that the conversion/correction processing is performed onto the pixel data elements that have been outputted from the pixel thinning portion 80, as shown in a flow chart of FIG. 16. This sub-routine is initiated with step S51 that is implemented to convert the gradation-value data set relating to the RGB intensity of the target pixel ($C_M$, $C_N$), into the gradation-value data set relating to the CMY density. Then, step S52 is implemented as the black generation processing to convert the CMY density gradation-value data set into gradation-value data set relating to the CMYK density (in which K density is added). At the subsequent step S53, the CMYK density gradation-value data set is subjected to γ correction. The steps S51-S53 are implemented by the CMY conversion portion 82, black generation portion 84 and γ correction portion 86. It is noted that each of the gradation-value data elements outputted from each of the functional portions is 8-bit data representative of a gradation value ranging from 0 to 255, and that the CMYK density gradation-value data outputted from the γ correction portion 86 is transferred to the error diffusion processing portion 90 via the pixel interpolating portion 88. In the present embodiment, steps S9, S12, S20, S23 cooperate to constitute a processed-image gradation-value data generating step.

(vii) Pixel Interpolation

After the conversion and correction processing, steps S13, S14 or steps S24, S25 are implemented to perform an error diffusion processing and a data-output-related processing onto the target pixel ($C_M$, $C_N$). However, in the following description, steps S15, S26 implemented by the pixel interpolating portion 88 will be described first. At step S15 implemented where the line processing proceeds in the forward direction, the column $f_N^{-1}(C_N)$ of the original image corresponding to the column $C_N$ of the current target pixel is obtained based on the column counter $C_N$ and according to the column-correspondence function $f_N^{-1}$, and then the column $f_N^{-1}(C_N+1)$ of the original image corresponding to the column ($C_N+1$) of the pixel that is targeted when the column counter $C_N$ is counted up. If the column $f_N^{-1}(C_N)$ and the column $f_N^{-1}(C_N+1)$ are equal to each other, namely, if they represents the same column of the original image, step S16 is implemented after the error diffusion processing and the data-output-related processing have been performed onto the target pixel ($C_M$, $C_N$). At step S16, the column counter $C_N$ is counted up, the CMYK density gradation-value data set of the last targeted pixel ($C_M$, $C_N-1$) that is retained in the pixel interpolating portion 88 is duplicatedly outputted to the error diffusion processing portion 90. On the other hand, at step S26 implemented where the line processing proceeds in the rearward direction, the column $f_N^{-1}(C_N)$ of the original image corresponding to the column $C_N$ of the current target pixel is obtained based on the column counter $C_N$ and according to the column-correspondence function $f_N^{-1}$, and then the column $f_N^{-1}(C_N-1)$ of the original image corresponding to the column ($C_N-1$) of the pixel that is targeted when the column counter $C_N$ is counted down. If the column $f_N^{-1}(C_N)$ and the column $f_N^{-1}(C_N-1)$ are equal to each other, namely, if they represents the same column of the original image, step S27 is implemented after the error diffusion processing and the data-output-related processing have been performed onto the target pixel ($C_M$, $C_N$). At step S27, the column counter $C_N$ is counted down, the CMYK density gradation-value data set of the last target pixel ($C_M$, $C_N+1$) that is retained in the pixel interpolating portion 88 is duplicatedly outputted to the error diffusion processing portion 90. The above-described steps S15, S16, S26 and S27 are implemented in accordance with command signals issued by the controller portion 120, whereby the pixels are interpolated in the enlargement processing in the main scanning direction.

The pixel interpolation cooperates with the above-described pixel thinning to realize the compressing and enlargement processings in the main scanning direction. The compressing and enlargement processings are performed by the pixel thinning portion 80 and pixel interpolating portion 88, based on the counting-up and down of the column counters $C_N$, $C_n$ by the controller portion 120 and according to the column-correspondence functions $f_N, f_N^{-1}$. Therefore, irrespective of whether the processing direction of the line processing is the forward direction or the reverse direction, the pixel lines of the original image are all the same to each other with respect to columns in which the deleted pixels are located, and the pixels lines of the processed image are all the same to each other with respect to adjacent pairs of columns between which the added pixels are added. Thus, the controller portion 120, pixel thinning portion 80 and pixel interpolating portion 88 cooperate with each other to function as a pixel-number change controller.

(viii) Error Diffusion Processing

Figure 17:
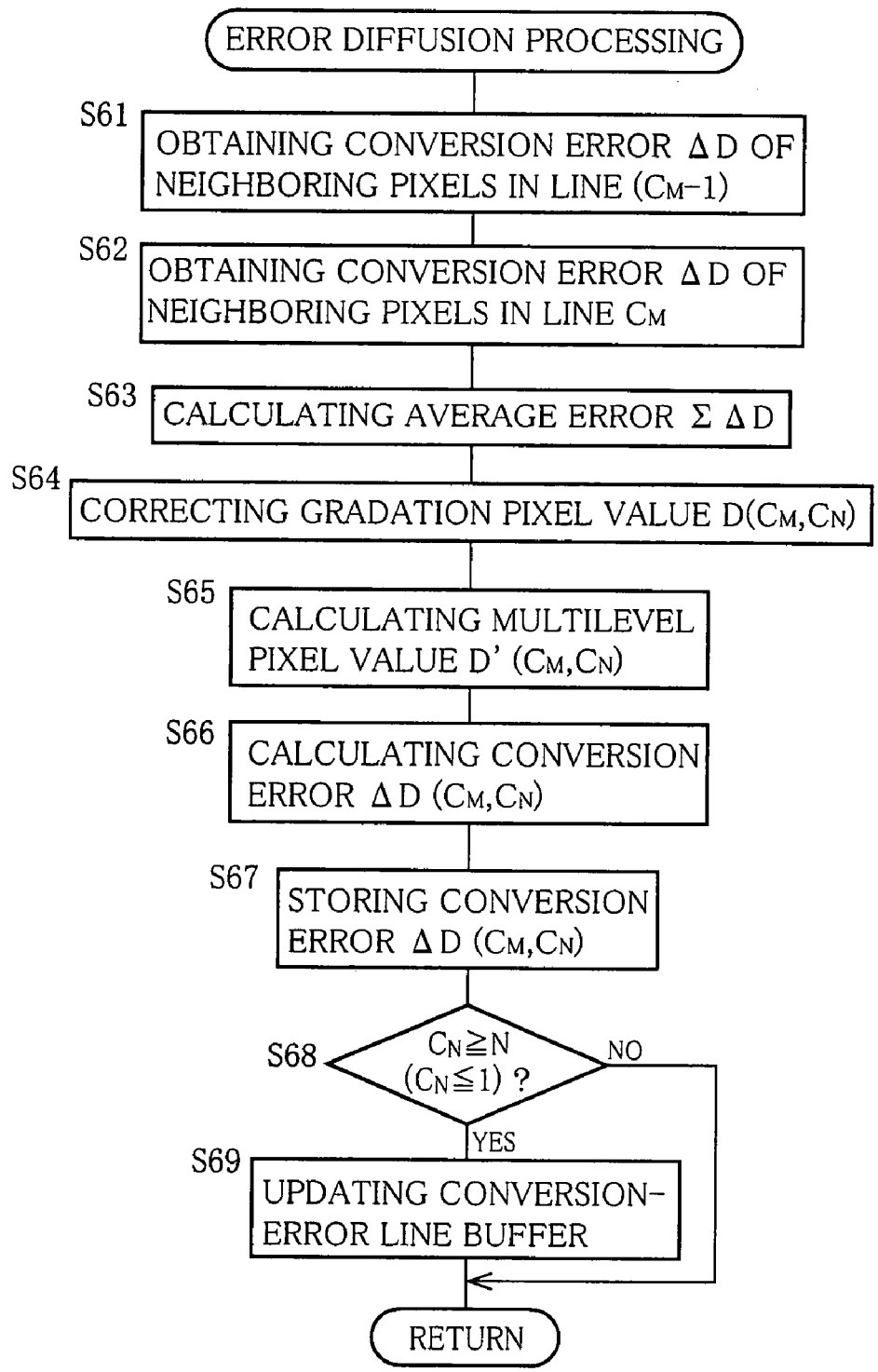
FIG. 17 is a flow chart showing an error diffusion processing, which is executed as a sub-routine of the image-data conversion routine of FIG. 8.

After the conversion and correction processing has been performed, step S13 or S24 is implemented to perform the error diffusion processing as one of the sub-routines of the image-data conversion routine, so that the error diffusion processing is performed onto the CMYK density gradation-value data set of the target pixel ($C_M$, $C_N$) that has been outputted from the pixel thinning portion 80, as shown in a flow chart of FIG. 17. The CMYK density gradation-value data set consists of four data elements indicative of the respective CMYK density values as gradation values of the target pixel, so that the four data elements are processed by the respective four error diffusion portions 90, individually of each other. In the following description as to the error diffusion processing, a gradation value (as a concept generic to the four gradation values) of the target pixel ($C_M$, $C_N$) will be referred to as a "gradation value D ($C_M$, $C_N$)", and a multilevel value of the target pixel ($C_M$, $C_N$) that is obtained from the gradation value D ($C_M$, $C_N$) will be referred to as a "multilevel value D' ($C_M$, $C_N$)", so that the following description is provided by generalizing processings of C, M, Y, K of the target pixel. It is noted that, in the following description, the error diffusion processing in case of the line processing proceeding in the forward direction will be mainly described with reference to FIG. 18, and the error diffusion processing in case of the line processing proceeding in the reverse direction will be complementarily described with reference to FIG. 19.

Figure 18:
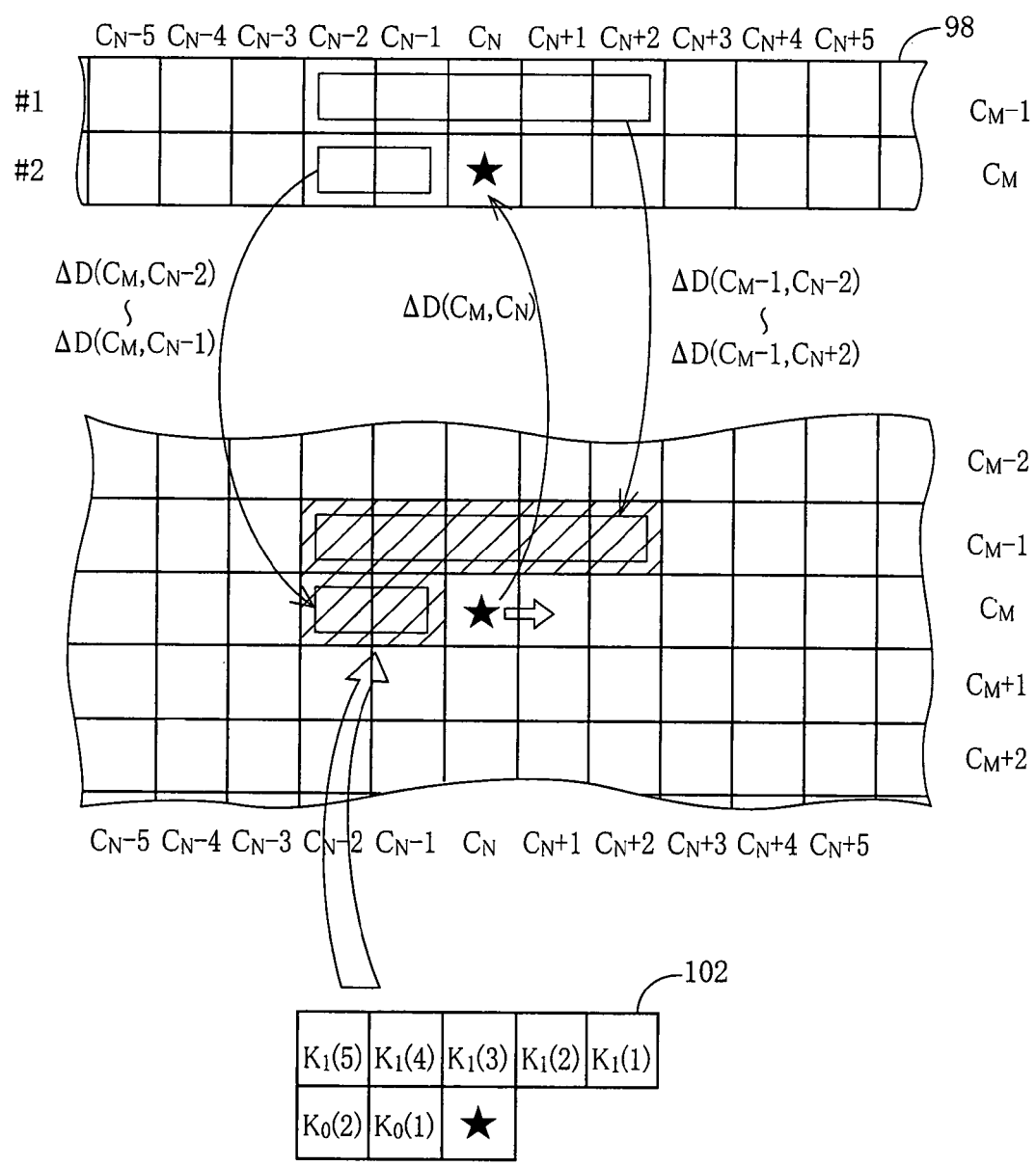
FIG. 18 is a view conceptually showing performance of the error diffusion processing by the image data processing device where the line processing proceeds in the forward direction.

Each of the error diffusion processing portions 90 is provided with the conversion-error line buffer 98 that has the two storage lines #1, #2 each of which is arranged (in the initial setting at step S3 that is described above) to store therein the pixel data elements of pixels whose number corresponds to the number N of columns of the processed image. FIG. 18 shows a state of the conversion-error line buffer 98 in which the line processing performed on the subjected pixel line $C_M$ in the forward direction has proceeded to a certain stage. In the storage line #1, there are stored conversion error values ΔD of the respective columns of the last line ($C_M-1$) that had been subjected to the last execution of the line processing. In the storage line #2, there are stored conversion error values ΔD of the columns of the currently subjected pixel line $C_M$ that have been already subjected to the current execution of the line processing. The error diffusion processing is initiated with step S61 that is implemented to obtain conversion error values ΔD ($C_M-1$, $C_N+2$), ΔD ($C_M-1$, $C_N+1$), ΔD ($C_M-1$, $C_N$), ΔD ($C_M-1$, $C_N-1$), ΔD ($C_M-1$, $C_N-2$) of the columns ($C_N+2$), ($C_N+1$), $C_N$, ($C_N-1$), ($C_N-2$) that are neighboring to the target pixel ($C_M$, $C_N$), from the storage line #1 of the conversion-error line buffer 98 that stores conversion error values ΔD of the line ($C_M-1$). At this step S61, the above-described conversion error values ΔD are obtained by the buffer controller portion 104 which reads out these conversion error values ΔD from a region of the storage line #1 that stores them and which then transfers the read conversion error values ΔD to the average error-value calculator portion 100. Step S61 is followed by step S62 that is implemented to obtain conversion error values ΔD ($C_M$, $C_N-1$), ΔD ($C_M$, $C_N-2$) of the columns ($C_N-1$), ($C_N-2$) that are neighboring to the target pixel ($C_M$, $C_N$), from the storage line #2 of the conversion-error line buffer 98 that stores conversion error values ΔD of the line $C_M$. At this step S62, the above-described conversion error values ΔD are obtained by the buffer controller portion 104 which reads out these conversion error values ΔD from a region of the storage line #2 that stores them and which then transfers the read conversion error values ΔD to the average error-value calculator portion 100.

In the subsequent step S63, an average error value ΣΔD of the neighboring pixels located in the two lines $C_M$, ($C_M$-1) is calculate by the average error-value calculator portion 100, based on the above-described conversion error values ΔD of the neighboring pixels. The average error value ΣΔD is a weighted average, and is calculated based on seven weighting coefficients $K_1(1)$-$K_1(5)$ and $K_0(1)$-$K_0(2)$ of the error diffusion filter 102 (that are predetermined for the respective seven neighboring pixels according to their positions relative to the target pixel) and according to the to the following expression 2:

$$\sum \Delta D = \sum_{i=1}^{5} \{K_1(i) \times \Delta D(C_M - 1, C_N + 3 - i)\} + \sum_{j=1}^{2} \{K_0(j) \times \Delta D(C_M, C_N - j)\} \quad \text{[Expression 2]}$$

It is noted that the weighting coefficients $K_1(1)$, $K_1(2)$, $K_1(3)$, $K_1(4)$, $K_1(5)$, $K_0(1)$, $K_0(2)$ are set at 1/16, 1/16, 4/16, 1/16, 1/16, 4/16, 4/16, respectively.

After the average error value ΣΔD of the pixels neighboring to the target pixel ($C_M$, $C_N$) has been calculated, step S64 is implemented to compensate or correct the gradation value D ($C_M$, $C_N$) of the target pixel ($C_M$, $C_N$), based on the average error value τΔD. In this correction performed by the corrector portion 92 that is constituted principally by an adder device, the gradation value D ($C_M$, $C_N$) and the average error value ΣΔD are added to each other.

Step S64 is followed by step S65 in which the multilevel value of the target pixel ($C_M$, $C_N$) is calculated based on the corrected gradation value $D_H$ ($C_M$, $C_N$) (=D ($C_M$, $C_N$)+ΣΔD) of the target pixel ($C_M$, $C_N$). This calculation is performed by the comparator portion 94 that is constituted principally by a comparator device. The printer portion 40 is operable to form an image in accordance with an inkjet principle, and is arranged to eject an ink dot whose size is variable in three steps, onto a recording medium. Since the ejected ink dot is variable in three steps with respect to the its size, the multilevel value is a quaternary value in the present embodiment. Specifically described, the quaternary value as the multilevel value is set at one selected from among four values, i.e., "0", "1", "2", "3" which indicate: non-formation of the ink dot; formation of the ink dot having a small diameter; formation of the ink dot having a medium diameter; and formation of the ink dot having a large diameter, respectively. The error diffusion processing portion 90 stores therein three threshold values $S_1$, $S_2$, $S_3$ according to which the gradation value is converted into one of the four values. The comparator portion 94 compares the corrected gradation value $D_H$($C_M$, $C_N$) of the target pixel ($C_M$, $C_N$) with the threshold values $S_1$, $S_2$, $S_3$, so as to obtain the multilevel value D' ($C_M$, $C_N$) of the target pixel ($C_M$, $C_N$). Specifically described, where the gradation value $D_H$ ($C_M$, $C_N$) is not smaller than 0 and is smaller than the threshold $S_1$, the multilevel value D' ($C_M$, $C_N$) is set at "0". Where the gradation value $D_H$ is not smaller than the threshold $S_1$ and is smaller than the threshold $S_2$, the multilevel value D' is set at "1". Where the gradation value $D_H$ is not smaller than the threshold $S_2$ and is smaller than the threshold $S_3$, the multilevel value D' is set at "2". Where the gradation value $D_H$ is not smaller than the threshold $S_3$ and is smaller than the threshold $S_4$, the multilevel value D' is set at "3". The thus obtained multilevel value D' ($C_M$, $C_N$) is outputted from the error diffusion processing portion 90.

Next, step S66 is implemented by the conversion-error calculator portion 96, to calculate the conversion error value ΔD ($C_M$, $C_N$) of the target pixel ($C_M$, $C_N$), which is produced as a result of the conversion of the pixel data element from the gradation value into the multilevel value. At this step S66, the corrected gradation value $D_H$ ($C_M$, $C_N$) and the multilevel value D' ($C_M$, $C_N$) are inputted into the conversion-error calculator portion 96, whereby the conversion error value ΔD ($C_M$, $C_N$) is set at a value equal to the corrected gradation value $D_H$ ($C_M$, $C_N$) where the multilevel value D' ($C_M$, $C_N$) is "0", is set at a value equal to the corrected gradation value $D_H$ ($C_M$, $C_N$) minus the threshold value $S_1$ where the multilevel value D' ($C_M$, $C_N$) is "1", is set at a value equal to the corrected gradation value $D_H$ ($C_M$, $C_N$) minus the threshold value S2 where the multilevel value D' ($C_M$, $C_N$) is "2", and is set at a value equal to the corrected gradation value $D_H$ ($C_M$, $C_N$) minus the threshold value S3 where the multilevel value D' ($C_M$, $C_N$) is "3".

Figure 19:
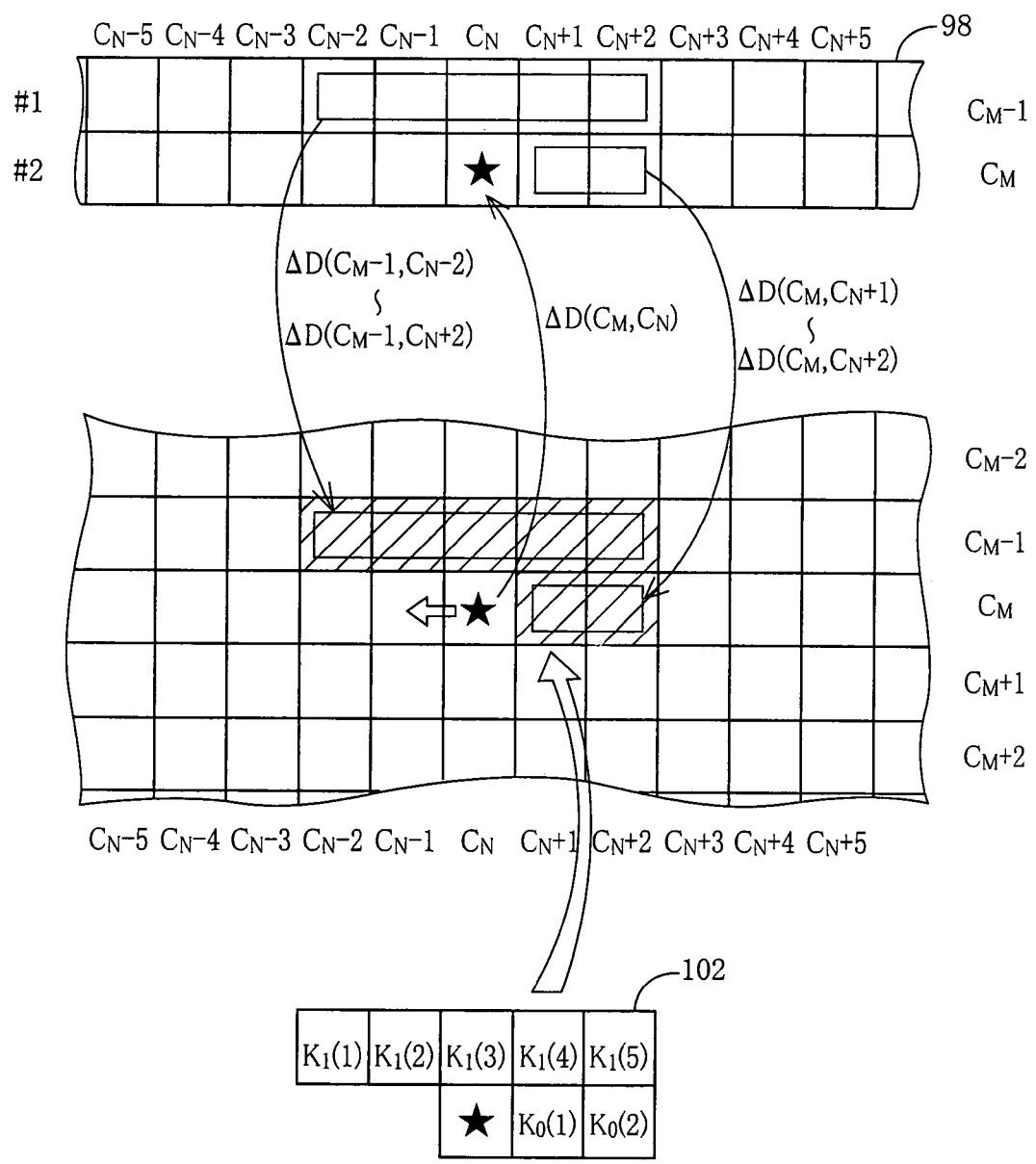
FIG. 19 is a view conceptually showing performance of the error diffusion processing by the image data processing device where the line processing proceeds in the reverse direction.

Step S66 is followed by step S67 in which the conversion error value ΔD ($C_M$, $C_N$) of the target pixel ($C_M$, $C_N$) is transferred to the conversion-error line buffer 98. At this step S67, the conversion error value ΔD ($C_M$, $C_N$) is stored into a storage column of the storage line #2 of the conversion-error line buffer 98, and the thus stored, conversion error value A D ($C_M$, $C_N$) is used for the next performance of the multileveling processing in which the target pixel is changed. Then, step S68 is implemented to determine whether the multileveling processing that has been now performed onto the target pixel ($C_M$, $C_N$) is a multileveling processing performed onto a final pixel in the current execution of the line processing, namely, whether the target pixel ($C_M$, $C_N$) that has been now subjected to the multileveling processing is a final one of the pixel lines that is currently subjected to the line processing. If a negative decision (NO) is obtained at step S68, the multileveling processing performed onto the one pixel is completed. If an affirmative decision (YES) is obtained at step S68, the control flow goes to step S69 that is implemented to update the conversion-error line buffer 98. At this step S69, the conversion error value ΔD ($C_M$, $C_N$) stored in the storage line #2 of the conversion-error line buffer 98 is transferred to the storage line #1. Steps S67 and S69 are implemented by the buffer controller portion 104, in accordance with command signals issued by the controller portion 120.

Where the line processing proceeds in the reverse direction for performing the error diffusion processing, the neighboring pixels are provided by pixels that are different (as shown in FIG. 19) from those in the above-described case where the line processing proceeds in the forward direction. This difference originates from the difference with respect to the direction in which the target pixel is shifted. Described specifically, the neighboring pixels are provided by pixels ($C_M$-1, $C_N$-2), ($C_M$-1, $C_N$-1), ($C_M$-1, $C_N$), ($C_M$-1, $C_N$+1), ($C_M$-1, $C_N$+2), ($C_M$, $C_N$+1), ($C_M$, $C_N$+2). Further, the arrangement of the seven weighting coefficients $K_1(1)$-$K_1(5)$ and $K_0(1)$-$K_0(2)$ of the error diffusion filter 102 is different from that in the case where the line processing proceeds in the forward direction. The average error value ΣΔD is calculated according to the following expression 3:

$$\sum \Delta D = \sum_{i=1}^{5} \{K_1(i) \times \Delta D(C_M - 1, C_N - 3 + i)\} + \quad \text{[Expression 3]}$$

$$\sum_{j=1}^{2} \{K_0(j) \times \Delta D(C_M, C_N + j)\}$$

However, this case of the line processing proceeding in the forward direction is the same as the case of the line processing proceeding in the rearward direction, with respect to the routine for the error diffusion processing. The multilevel value D' ($C_M$, $C_N$) of the target pixel ($C_M$, $C_N$) is obtained, the conversion error value $\Delta D$ ($C_M$, $C_N$) of the target pixel ($C_M$, $C_N$) is transferred to the conversion-error line buffer 98, and the line buffer 98 is updated, as shown in the flow chart of FIG. 17.

It is noted that, irrespective of whether the line processing proceeds in the forward or reverse direction, some or all of the neighboring pixels are absent when the line counter $C_M$ takes a value of "1", and when the column counter $C_N$ takes a value of 1, 2, (N−1) or N. In such a case, the error diffusion processing is performed, with the conversion error value $\Delta D$ of the absent or actually non-existing neighboring pixel being set at "0". In the present embodiment, steps S13 and S24 cooperate to constitute a processed-image multilevel-value data generating step.

(ix) Data-Output-Related Processing

Figure 20:
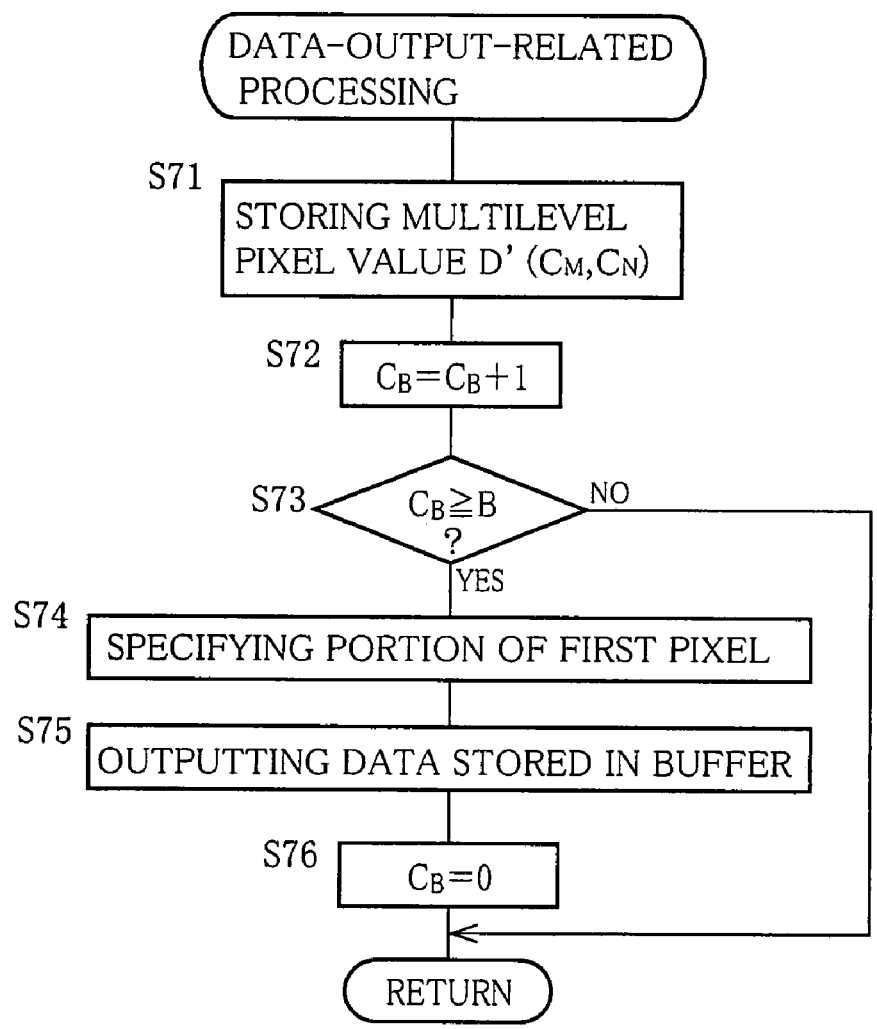
FIG. 20 is a flow chart showing a data-output-related processing, which is executed as a sub-routine of the image-data conversion routine of FIG. 8.

After the error diffusion processing has been performed, step S14 or S25 is implemented to perform the data-output-related processing as one of the sub-routines of the image-data conversion routine as shown in a flow chart of FIG. 20. As described above, each of the four error diffusion processing portions 90 generates each pixel data element provided by the multilevel value relating to a corresponding one of the CMYK density values of the target pixel ($C_M$, $C_N$). Since the multilevel value is the quaternary value, each pixel data element is a 2-bit data. On the other hand, the data that is outputted from the present image data processing device 10 takes the form of a plurality of serial data sets each of which is serially outputted as one data unit from the image data processing device 10. Each of the serial data sets is provided by the multilevel-value data sets of a plurality of pixels (e.g., a total of B pixels) of the processed image. The data-output-related processing is performed for preparing such serial data sets.

Figure 21:
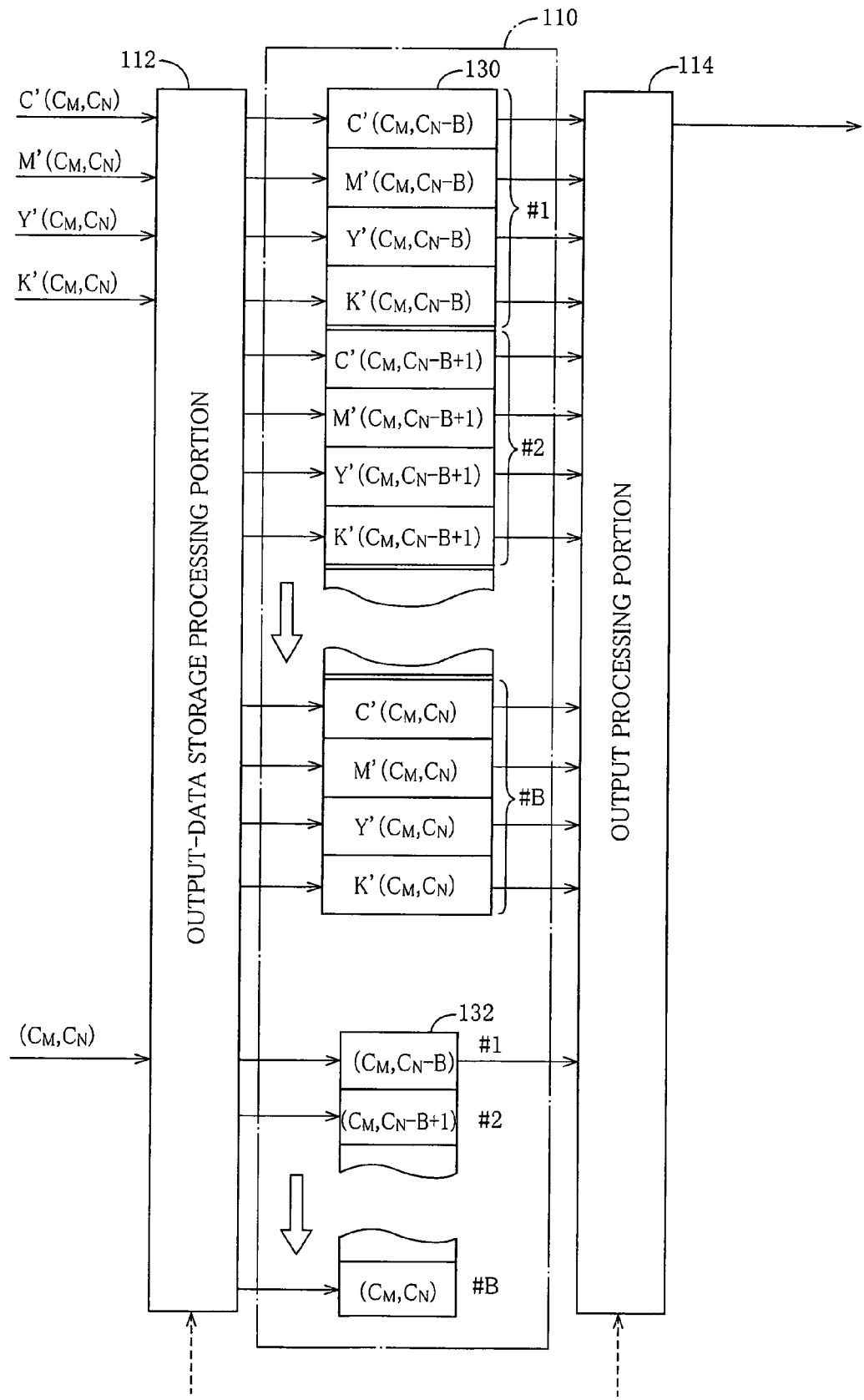
FIG. 21 is a view conceptually showing performance of the data-output-related processing by the image data processing device where the line processing proceeds in the forward direction.
Figure 22:
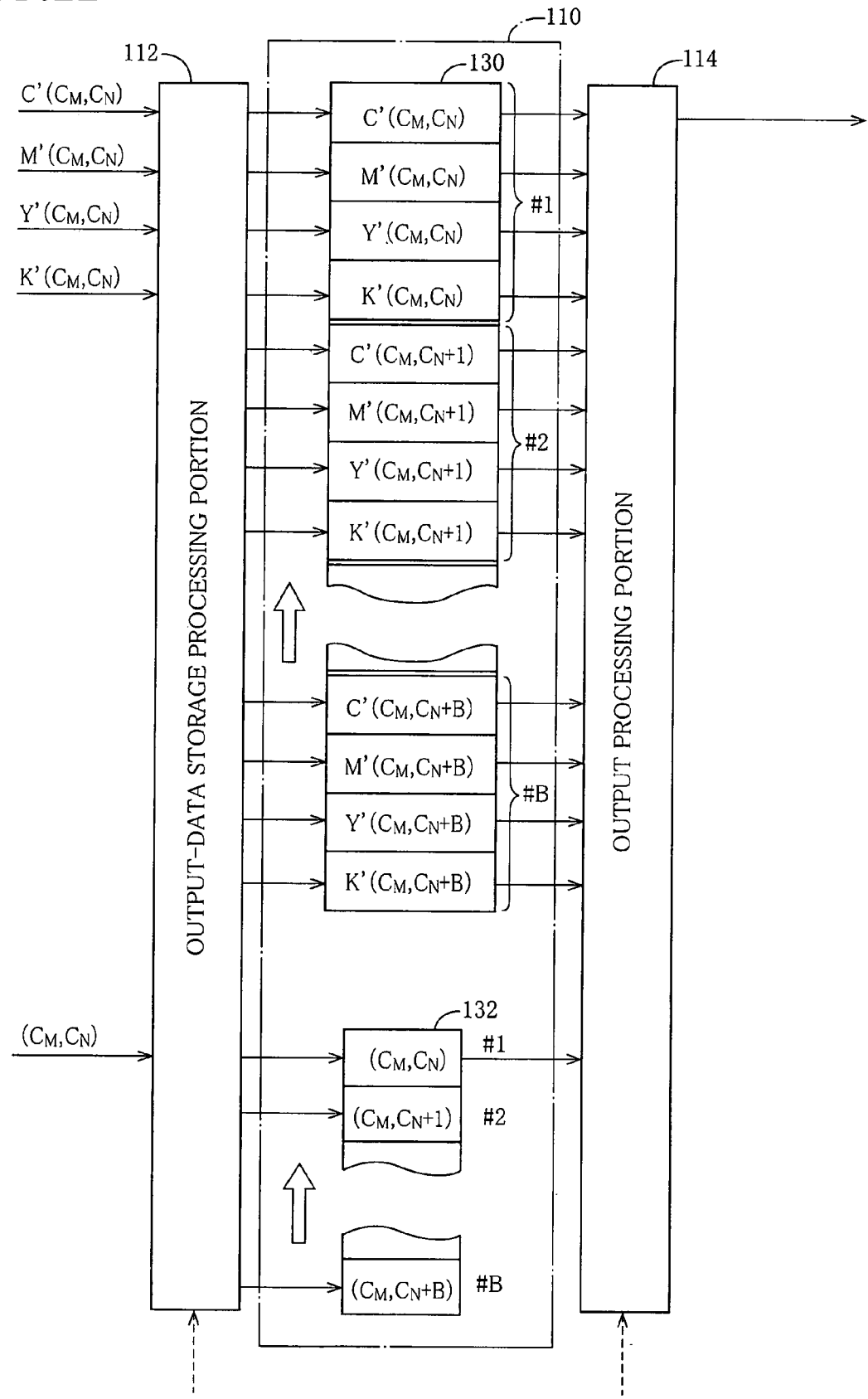
FIG. 22 is a view conceptually showing performance of the data-output-related processing by the image data processing device where the line processing proceeds in the reverse direction.

The data-output-related processing is initiated with step S71 in which the multilevel values C' ($C_M$, $C_N$), M ($C_M$, $C_N$), Y' ($C_M$, $C_N$), K ($C_M$, $C_N$) relating to the respective CMYK density values of the target pixel ($C_M$, $C_N$), which have been obtained in the error diffusion processing, are stored into the output data buffer 110. As shown in FIGS. 21 and 22, the output data buffer 110 includes a multilevel-pixel-value memory portion 130 that has a plurality of storage blocks (a total of B storage blocks in the present embodiment) each capable of storing therein four multilevel values (i.e., a multilevel-value data set) of one pixel, so that the four multilevel values of each pixel can be stored in a corresponding one of the storage blocks #1-#B. The output data buffer 110 further includes a pixel-position memory portion 132 that has a plurality of storage cells (a total of B storage cells in the present embodiment) each capable of storing therein the pixel line No. and pixel column No. indicative of a position of the pixel (that has been already subjected to the error diffusion processing) in the processed image, so that the pixel positions ($C_M$, $C_N$) (each corresponding to a corresponding one of the multilevel-value data sets) are stored in the respective storage cells #1-#B. The multilevel-value data sets of the respective pixels are sequentially stored into the respective storage blocks #1-#B in an order that is dependent on the processing direction of the currently executed line processing. Similarly, the data elements (hereinafter referred to as "pixel-position data elements") indicative of the respective pixel positions are sequentially stored into the respective storage cells #1-#B in an order that is dependent on the processing direction of the currently executed line processing. Specifically described, where the currently executed line processing proceeds in the forward direction, the multilevel-value data sets are stored in the respective storage blocks #1, #2, . . . , #B in this order of description, and the pixel-position data elements are stored in the respective storage cells #1, #2, . . . ,#B in this order of description, as shown in FIG. 21. On the other hand, where the currently executed line processing proceeds in the reward direction, the multilevel-value data sets are stored in the respective storage blocks #B, . . . , #2, #1 in this order of description, and the pixel-position data elements are stored in the respective storage cells #B, . . . , #2, #1 in this order of description, as shown in FIG. 22. It is noted that each of FIGS. 21 and 22 shows a state in which one data unit (that is provided by one serial data set, as described above) has been completely stored into the output data buffer 110. This step S72 is implemented by the output-data storage processing portion 112 in accordance with command signals issued by the controller portion 120.

After the multilevel-value data set and the pixel-position data element of one pixel have been stored in the multilevel-pixel-value memory portion 130 and the pixel-position memory portion 132, step S72 is implemented to count up the buffer counter CB that is arranged to indicate the number of the pixels whose data (such as the multilevel-value data set and the pixel-position data element) has been already stored in the output data buffer 110. Step S72 is followed by step S73 to determine whether the value indicated by the buffer counter CB has reached the value "B" that is the number of the pixels whose data corresponds to one serial data set, i.e., one data unit. If an affirmative decision is obtained at step S73, namely, if it is determined that all the data constituting one data unit has been stored into the output data buffer 110, step S74 is implemented to specify the position of a first pixel whose column No. is the smallest among the B pixels. Then, step S74 is followed by step S75 in which the pixel-position data element indicative of the specified position of the first pixel and also the multilevel-value data sets of the respective B pixels are transferred from the output data buffer 110 to at least one of the processed-data storage portion 38 and the printer portion 40. In this instance, the multilevel-value data sets of the respective B pixels are sequentially transferred in order of numbering of the pixel column of each of the B pixels. Described specifically, the pixel-position data element stored in the storage cell #1 of the pixel-position memory portion 132 is read out, and the multilevel-value data sets stored in the respective storage blocks #1, #2, . . . , #B of the multilevel-pixel-value memory portion 130 are sequentially read out in the order from the storage block #1 to storage block #B. Then, the pixel-position data element and the multilevel-value data sets cooperate to constitute one serial data set, so as to be serially outputted as one data unit from the present image data processing device 10. The process of output of each data unit is performed by the output processing portion 114 in accordance with command signals issued by the controller portion 120. Step S75 is followed by step S76 in which the buffer counter CB is reset.

After implementation of step S14 or S25, namely, after performance of the data-output-related processing, as described above, the control flow goes to step S15 or S26 (see FIG. 8), and the pixel interpolation is performed as needed. Then, step S17 or S28 is implemented to determine whether the execution of the line processing is completed. If not yet completed, step S18 or S29 is implemented to count up or down the column counter $C_n$, and step S9 and steps following step S9 or step S20 and steps following step S20 are implemented to perform out a series of processings as described above. If it is determined that the execution of the line processing is completed, the control flow goes to step S30 to determine whether all the pixel lines of the processed image have been subjected to the line processing. If a negative decision (NO) is obtained at step S30, the control flow goes to step S31 in which the line counter $C_M$ is counted up whereby the subjected pixel line is shifted so that the processings are performed on the newly subjected pixel line by implementation of step S6 and the subsequent steps. If an affirmative decision (YES) is obtained at step S30, the present image-data conversion routine is completed.

Modifications of Embodiment

In the above-described embodiment, the compressing of the image in the sub-scanning or main scanning direction is performed by simply deleting certain pixel lines or pixels, while the enlargement of the image in the sub-scanning or main scanning direction is performed by simply adding pixel lines or pixels between certain adjacent pairs of pixel lines or between certain adjacent pairs of pixels. However, the compressing and enlargement of the image may be performed in modified manners. For example, in the compressing processing, adjacent pairs of pixel lines or adjacent pairs of pixels, which become contiguous to each other as a result of deletion of the pixel lines or pixels that had been interposed therebetween, may be subjected to a certain correction processing. Further, the compressing processing may be modified by including: a step of calculating average of pixel values of pixels composing certain adjacent pairs of pixel lines or calculating average of pixels values of certain adjacent pairs of pixels; a step of generating new pixel lines based on the adjacent pairs of pixel lines or generating new pixels based on the adjacent pairs of pixels; and a step of replacing the adjacent pairs of pixel lines with the new pixel lines or replacing the adjacent pairs of pixels with the new pixels. Similarly, in the enlargement processing, adjacent pairs of pixel lines or adjacent pairs of pixels, which become non-contiguous to each other as a result of addition of the pixel lines or pixels therebetween, may be subjected to a certain correction processing. Further, the enlargement processing may be modified by including: a step of calculating average of pixel values of pixels composing certain adjacent pairs of pixel lines or calculating average of pixels values of certain adjacent pairs of pixels; a step of generating new pixel lines based on the adjacent pairs of pixel lines or generating new pixels based on the adjacent pairs of pixels; and a step of adding the new pixel lines between the certain adjacent pairs of pixel lines or adding the new pixels between the certain adjacent pairs of pixels.

In the above-described embodiment, the image data processing is performed by the image data processing device that is constituted principally by the electronic circuit. However, the image data processing may be performed by an image data processing device constituted principally by a computer. In such a case, it is possible to prepare programs in accordance with the above-described image-data conversion routine so that the image data processing is performed with the programs being executed by the computer. In the case of the performance through the execution of the program by the computer, the functional portions of the image data processing device 10 (that are provided by really existing components in the above-described embodiment) are provided by virtual or conceptual components.

What is claimed is:

1. An image data processing device for converting original data as image data representative of an original image composed of a plurality of pixels that are arranged in a matrix, into processed data as image data representative of a processed image composed of a plurality of pixels that are arranged in a matrix, wherein the original data contains gradation-value data relating to optical properties of each of the pixels of the original image while the processed data contains multilevel-value data relating to properties of each of the pixels of the processed image, said image data processing device comprising:

a processed-image gradation-value data generator operable to generate, based on the original data, gradation-value data relating to optical properties of each of the pixels of the processed image, by causing a plurality of pixel lines constituting the processed image to be sequentially subjected to a gradation-value-data-generation line processing, which is executed to generate the gradation value data of each of the pixels composing the subjected pixel line such that generation of the gradation-value data proceeds sequentially along the subjected pixel line in a gradation-value-data generation direction;

a processed-image multilevel-value data generator operable to generate, based on the generated gradation-value data of each of the pixels of the processed image and according to an error diffusion technique, the multilevel value data relating to the properties of each of the pixels of the processed image, by causing the plurality of pixel lines constituting the processed image to be sequentially subjected to a multilevel-value-data-generation line processing, which is executed to generate the multilevel-value data of each of the pixels composing the subjected pixel line such that generation of the multilevel-value data proceeds sequentially along the subjected pixel line in a multilevel-value-data generation direction; and a line-processing direction controller operable to cause the gradation-value-data-generation and multilevel-value-data-generation line processings to be executed on each of the pixel lines in the same direction as the gradation-value-data and multilevel-value-data generation directions, and to invert each of the gradation-value-data and multilevel-value-data generation directions each time when the subjected pixel line is shifted from one to another in execution of a corresponding one of the gradation-value-data generation and multilevel-value-data generation line processings.

2. The image data processing device according to claim 1, wherein said processed-image gradation-value data generator is capable of performing at least one of (a) a pixel-number reduction processing for thinning out original pixel-line component pixels as the pixels composing each of pixel lines constituting the original image whereby a number of processed pixel-line component pixels as the pixels composing each of the pixel lines of the processed image is made smaller than that of the original pixel-line component pixels, and (b) a pixel-number increase processing for interpolating the original pixel-line component pixels whereby the number of the processed pixel-line component pixels is made larger than that of the original pixel-line component pixels, said image data processing device further comprising a pixel-number change controller operable to control the gradation-value- data-generation line processing, wherein the gradation-value-data-generation line processing is controlled by said pixel-number change controller, where the pixel-number reduction processing is performed, such that each of the pixel lines of the processed image is obtained by deleting some of the original pixel-line component pixels from a corresponding one of the pixel lines of the original image, and such that the pixel lines of the original image are the same to each other with respect to positions of the deleted pixels, and wherein the gradation-value-data-generation line processing is controlled by said pixel-number change controller, where the pixel-number increase processing is performed, such that each of the pixel lines of the processed image is obtained by adding pixels to a corresponding one of the pixel lines of the original image, and such that the pixel lines of the original image are the same to each other with respect to positions of the added pixels.

3. The image data processing device according to claim 2, wherein said pixel-number change controller controls the gradation-value- data-generation line processing, based on an index indicative of correspondence of the original pixel-line component pixels to the processed pixel-line component pixels.

4. The image data processing device according to claim 2, wherein each of said at least one of said pixel-number reduction processing and said pixel-number increase processing is performed in accordance with a corresponding one of a desired compression ratio and a desired enlargement ratio.

5. The image data processing device according to claim 4, wherein said processed-image gradation-value data generator is operable to supply a data unit in the form of the generated gradation-value data relating to the optical properties of each of the pixels of the processed image, to said processed-image multilevel-value data generator, and wherein said processed-image multilevel-value data generator is operable, each time when the gradation-value data relating to the optical properties of each of the pixels is supplied to said processed-image multilevel-value data generator, to generate the multilevel value data relating to the properties of said each of the pixels of the processed image, based on the supplied gradation-value data relating to the optical properties of said each of the pixels.

6. The image data processing device according to claim 1, wherein said processed-image gradation-value data generator is capable of performing at least one of (A) a line-number reduction processing for thinning out pixel lines constituting the original image whereby a number of the pixel lines of the processed image is made smaller than that of the pixel lines of the original image, and (B) a line-number increase processing for interpolating the pixel lines of the original image whereby the number of the pixel lines of the processed image is made larger than that of the pixel lines of the original image.

7. The image data processing device according to claim 6, wherein said at least one of the line-number reduction processing and the line-number increase processing is performed based on an index indicative of correspondence of the pixel lines of the original image to the pixel lines of the processed image.

8. An image data processing method of converting original data as image data representative of an original image composed of a plurality of pixels that are arranged in a matrix, into processed data as image data representative of a processed image composed of a plurality of pixels that are arranged in a matrix, wherein the original data contains gradation-value data relating to optical properties of each of the pixels of the original image while the processed data contains multilevel-value data relating to properties of each of the pixels of the processed image, said image data processing method comprising:

a processed-image gradation-value data generating step of generating, based on the original data, gradation-value data relating to optical properties of each of the pixels of the processed image, by causing a plurality of pixel lines constituting the processed image to be sequentially subjected to a gradation-value-data-generation line processing, which is executed to generate the gradation value data of each of the pixels composing the subjected pixel line such that generation of the gradation-value data proceeds sequentially along the subjected pixel line in a gradation-value-data generation direction;

a processed-image multilevel-value data generating step of generating, based on the generated gradation-value data of each of the pixels of the processed image and according to an error diffusion technique, the multilevel value data relating to the properties of each of the pixels of the processed image, by causing the plurality of pixel lines constituting the processed image to be sequentially subjected to a multilevel-value-data- generation line processing, which is executed to generate the multilevel-value data of each of the pixels composing the subjected pixel line such that generation of the multilevel-value data proceeds sequentially along the subjected pixel line in a multilevel-value-data generation direction; and a line-processing direction controlling step of causing the gradation-value-data-generation and multilevel-value-data-generation line processings to be executed on each of the pixel lines in the same direction as the gradation-value-data and multilevel-value-data generation directions, and inverting each of the gradation-value-data and multilevel-value-data generation directions each time when the subjected pixel line is shifted from one to another in execution of a corresponding one of the gradation-value-data- generation and multilevel-value-data generation line processings.

9. The image data processing method according to claim 8, wherein said processed-image gradation-value data generating step includes at least one of (a) a pixel-number reduction processing for thinning out original pixel-line component pixels as the pixels composing each of pixel lines constituting the original image whereby a number of processed pixel-line component pixels as the pixels composing each of the pixel lines of the processed image is made smaller than that of the original pixel-line component pixels, and (b) a pixel-number increase processing for interpolating the original pixel-line component pixels whereby the number of the processed pixel-line component pixels is made larger than that of the original pixel-line component pixels, said image data processing method further comprising a pixel-number change controlling step of controlling the gradation-value- data-generation line processing, wherein the gradation-value-data-generation line processing is controlled, where the pixel-number reduction processing is performed, such that each of the pixel lines of the processed image is obtained by deleting some of the original pixel-line component pixels from a corresponding one of the pixel lines of the original image, and such that the pixel lines of the original image are the same to each other with respect to positions of the deleted pixels, and wherein the gradation-value-data-generation line processing is controlled, where the pixel-number increase processing is performed, such that each of the pixel lines of the processed image is obtained by adding pixels to a corresponding one of the pixel lines of the original image, and such that the pixel lines of the original image are the same to each other with respect to positions of the added pixels.

10. The image data processing method according to claim 9, wherein said pixel-number change controlling step is implemented to control the gradation-value-data-generation line processing, based on an index indicative of correspondence of the original pixel-line component pixels to the processed pixel-line component pixels.

11. The image data processing method according to claim 9, wherein each of said at least one of said pixel-number reduction processing and said pixel-number increase processing is performed in accordance with a corresponding one of a desired compression ratio and a desired enlargement ratio.

12. The image data processing method according to claim 11, wherein said processed-image multilevel-value data generating step is implemented, each time when the gradation-value data relating to the optical properties of each of the pixels is generated in said processed-image gradation-value data generating step, to generate the multilevel value data relating to the properties of said each of the pixels of the processed image, based on the generated gradation-value data relating to the optical properties of said each of the pixels.

13. The image data processing method according to claim 8, wherein said processed-image gradation-value data generating step includes at least one of (A) a line-number reduction processing for thinning out pixel lines constituting the original image whereby a number of the pixel lines of the processed image is made smaller than that of the pixel lines of the original image, and (B) a line-number increase processing for interpolating the pixel lines of the original image whereby the number of the pixel lines of the processed image is made larger than that of the pixel lines of the original image.

14. The image data processing method according to claim 13, wherein said at least one of the line-number reduction processing and the line-number increase processing is performed based on an index indicative of correspondence of the pixel lines of the original image to the pixel lines of the processed image.

* * * * *